(12) United States Patent
Ahn et al.

(10) Patent No.: US 12,647,215 B2
(45) Date of Patent: Jun. 2, 2026

(54) APPARATUS AND METHOD FOR TRANSMITTING DATA IN WIRELESS COMMUNICATION SYSTEM

(71) Applicant: SAMSUNG ELECTRONICS CO., LTD., Suwon-si (KR)

(72) Inventors: Jinsoo Ahn, Suwon-si (KR); Joondoo Kim, Suwon-si (KR); Dongwoo Lee, Suwon-si (KR); Younggoo Han, Suwon-si (KR); Jiyun Seol, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 17/939,861

(22) Filed: Sep. 7, 2022

(65) Prior Publication Data

US 2023/0006779 A1 Jan. 5, 2023

Related U.S. Application Data

(63) Continuation of application No. PCT/KR2021/002912, filed on Mar. 9, 2021.

(30) Foreign Application Priority Data

Mar. 9, 2020 (KR) ........................ 10-2020-0029288

(51) Int. Cl.
*H04L 1/1822* (2023.01)
*H04L 1/00* (2006.01)
(Continued)

(52) U.S. Cl.
CPC .......... *H04L 1/1822* (2013.01); *H04L 1/0003* (2013.01); *H04L 1/1642* (2013.01); *H04L 1/1812* (2013.01); *H04L 5/0053* (2013.01)

(58) Field of Classification Search
CPC ... H04L 1/1812; H04L 1/0003; H04L 1/1642; H04L 5/0053; H04L 1/1819;
(Continued)

(56) References Cited

U.S. PATENT DOCUMENTS 10,785,791 B1 9/2020 Eyuboglu
2006/0114936 A1* 6/2006 Paffen ................... H04W 28/14
370/469
(Continued)

FOREIGN PATENT DOCUMENTS

CN 108541360 9/2018
CN 109716696 5/2019
(Continued)

OTHER PUBLICATIONS

International Search Report for PCT/KR2021/002912, dated Jun. 23, 2021, 3 pages.
(Continued)

*Primary Examiner* — Nicholas Jensen
*Assistant Examiner* — Ayodele Lawrence Olubodun
(74) *Attorney, Agent, or Firm* — Nixon & Vanderhye, P.C.

(57) ABSTRACT

The present disclosure relates to a $5^{th}$ generation (5G) or pre-5G communication system for supporting a higher data transmission rate than a $4^{th}$ generation (4G) communication system such as long term evolution (LTE). According to various embodiments of the present disclosure, in a wireless communication system, a base station comprises: at least one transceiver, and at least one processor coupled to the at least one transceiver. The at least one processor may be configured to: control the at least one transceiver to transmit first data based on a first hybrid automatic request (HARQ) process; control the at least one transceiver to transmit second data based on the first HARQ process; based on
(Continued)

transmitting the second data, generate third databased on the result of the first data being received; and control the at least one transceiver to transmit the third data based on a second HARQ process.

12 Claims, 19 Drawing Sheets

(51) Int. Cl.

| | | |
|---|---|---|
| *H04L 1/1607* | (2023.01) | |
| *H04L 1/1812* | (2023.01) | |
| *H04L 5/00* | (2006.01) | |

(58) Field of Classification Search
CPC ... H04L 1/1825; H04L 1/1896; H04L 1/1822; H04L 1/0005; H04L 1/0011; H04L 1/0002; H04L 1/1628; H04L 69/321; H04B 17/382
See application file for complete search history.

(56) References Cited

U.S. PATENT DOCUMENTS

| | | | | |
|---|---|---|---|---|
| 2008/0188224 | A1* | 8/2008 | Pani | H04W 76/27 |
| | | | | 455/436 |
| 2010/0042888 | A1 | 2/2010 | Kuo | |
| 2010/0281322 | A1* | 11/2010 | Park | H04L 1/1825 |
| | | | | 714/E11.131 |
| 2013/0250747 | A1* | 9/2013 | Nammi | H04L 1/1887 |
| | | | | 370/216 |
| 2014/0126551 | A1* | 5/2014 | Nammi | H04L 1/1819 |
| | | | | 370/336 |
| 2015/0016318 | A1 | 1/2015 | Lee et al. | |
| 2016/0218837 | A1 | 7/2016 | Svedman et al. | |
| 2016/0234820 | A1* | 8/2016 | Mallik | H04L 1/1861 |
| 2018/0034596 | A1 | 2/2018 | Noh et al. | |
| 2018/0241511 | A1 | 8/2018 | Harada et al. | |
| 2019/0191486 | A1 | 6/2019 | Myung et al. | |
| 2019/0356426 | A1 | 11/2019 | He et al. | |
| 2020/0044790 | A1* | 2/2020 | Vaidya | H04L 1/1829 |
| 2020/0322095 | A1* | 10/2020 | Park | H04W 4/40 |
| 2021/0167897 | A1* | 6/2021 | Seidel | H04L 1/1864 |
| 2021/0194639 | A1* | 6/2021 | Yu | H04L 1/1848 |

FOREIGN PATENT DOCUMENTS

| | | | | |
|---|---|---|---|---|
| CN | 110447193 | | 11/2019 | |
| EP | 3 387 775 A1 | | 10/2018 | |
| EP | 3358772 B1 | * | 11/2019 | H04W 72/27 |
| KR | 10-2016-0066026 | | 6/2016 | |
| WO | 2013147490 A1 | | 10/2013 | |
| WO | 2016/130362 | | 8/2016 | |
| WO | 2017026433 A1 | | 2/2017 | |
| WO | 2017/100096 A1 | | 6/2017 | |
| WO | 2019/106601 | | 6/2019 | |
| WO | 2020/030710 | | 2/2020 | |

OTHER PUBLICATIONS

Written Opinion of the ISA for PCT/KR2021/002912; dated Jun. 23, 2021, 4 pages.
"HARQ process collision between CG and DG", Huawei, HiSilicon, Discussion and Decision, 3GPP TSG-RAN WG2 Meeting #109 electronic R2-2001010, pp. 1-3.
Extended European Search Report dated May 15, 2023 issued in European Application No. 21768799.5 (9 pages).
Office Action dated Mar. 18, 2025 in Chinese Application No. 202180032598.0 and English-language translation.
Extended Search Report dated Oct. 10, 2025 in European Patent Application No. 25201167.1.
Office Action dated Dec. 2, 2025 in Korean Patent Application No. 10-2020-0029288 and English-language translation.
Notice of Allowance issued Jan. 7, 2026 in Chinese Application No. 202180032598.0 with English translation.

* cited by examiner

APPARATUS AND METHOD FOR TRANSMITTING DATA IN WIRELESS COMMUNICATION SYSTEM

CROSS-REFERENCE TO RELATED APPLICATIONS

This application is a continuation of International Application No. PCT/KR2021/002912 designating the United States, filed on Mar. 9, 2021, in the Korean Intellectual Property Receiving Office and claiming priority to Korean Patent Application No. 10-2020-0029288, filed on Mar. 9, 2020, in the Korean Intellectual Property Office, the disclosures of which are incorporated by reference herein in their entireties.

BACKGROUND

Field

The disclosure relates to a wireless communication system, and for example, to an apparatus and a method for transmitting data in a wireless communication system.

Description of Related Art

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud radio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

In a wireless communication environment, a transmission end and a reception end are required to guarantee reliability of transmission in a wireless channel. To achieve this, a base station or a terminal may use a retransmission technique and an error correction technique on various layers. In particular, the base station or terminal may identify whether data received by a physical layer includes an undecodable error, through a hybrid automatic repeat request (HARQ) method in which forward error correction (FEC) and automatic request (ARQ) are combined, and may request retransmission when an error occurs, thereby enhancing performance.

In a wireless communication environment, a transmission end and a reception end are required to guarantee reliability of transmission in a wireless channel. To achieve this, a base station or a terminal may use a retransmission technique and an error correction technique on various layers. In particular, the base station or terminal may identify whether data received by a physical layer includes an undecodable error, through a hybrid automatic repeat request (HARQ) method in which forward error correction (FEC) and automatic request (ARQ) are combined, and may request retransmission when an error occurs, thereby enhancing performance.

SUMMARY

Embodiments of the disclosure provide an apparatus and a method for addressing degradation of a throughput caused by a relative shortage of a hybrid automatic request (HARQ) identifier (ID) in a wireless communication system.

Embodiments of the disclosure provide a procedure for preventing/reducing degradation of a throughput in an environment where an inter-cell delay occurs in a system which utilizes carrier aggregation (CA), and a procedure for retransmitting therefor.

Embodiments of the disclosure provide a procedure for preventing and/or reducing degradation of a throughput in an environment where an inter-cell delay occurs in a system which utilizes carrier aggregation (CA) between cells utilizing different time-frequency basic units (numerology), and a procedure for retransmitting therefor.

According to various example embodiments of the disclosure, a method of operating a base station in a wireless communication system may include: transmitting first data based on a first hybrid automatic request (HARQ) process; transmitting second data based on the first HARQ process; based on transmitting the second data, generating third data based on a result of receiving on the first data; and transmitting the third data based on a second HARQ process.

According to various example embodiments of the disclosure, a base station in a wireless communication system may include: at least one transceiver; and at least one processor coupled with the at least one transceiver, and the at least one processor may be configured to: control the at least one transceiver to transmit first data based on a first hybrid automatic request (HARQ) process; control the at least one transceiver to transmit second data based on the first HARQ process; based on transmitting the second data, generate third data based on a result of receiving on the first data; and control the at least one transceiver to transmit the third data based on a second HARQ process.

The apparatus and the method according to various example embodiments of the disclosure may address performance degradation caused by a shortage of hybrid automatic request (HAQR) identifier (ID), thereby enhancing downlink performance of a communication system.

In addition, the apparatus and the method according to various example embodiments of the disclosure may adaptively operate an HARQ process procedure according to a channel condition, thereby enhancing communication performance.

The effects achieved in the disclosure are not limited to those mentioned above, and other effects that are not mentioned above may be clearly understood to those skilled in the art based on the description provided below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
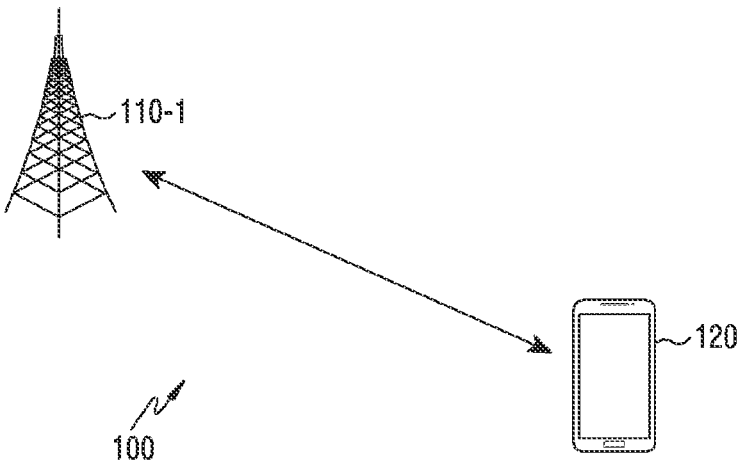
FIGS. 1A and 1B are diagrams illustrating an example of a wireless communication environment according to various embodiments.

The terms used in the disclosure are used to describe various example embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the disclosure, they should not be interpreted as excluding embodiments of the disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for a wireless communication retransmission procedure. For example, the disclosure describes data transmission and retransmission procedures in a wireless communication system, and also describes a solution for adaptively utilizing the procedures in combination with existing operations.

As used herein, terms related to carrier aggregation (CA) (for example, Cell, special cell (SpCell), primary cell (PCell), secondary cell (SCell), frequency range (FR), etc.), terms related to transmission/retransmission techniques (for example, automatic retransmission request (ARQ), hybrid ARQ (HARQ), HARQ process, acknowledgement (ACK), non-ACK (NACK), etc.), terms indicating signals (for example, a reference signal, system information, a control signal, a message, data), terms indicating network entities (for example, a communication node, a radio node, a radio unit, a network node, a master node (MN), a secondary node (SN), transmission/reception point (TRP), a digital unit (DU), a radio unit (RU), a massive MIMO unit (MMU)) are merely examples for convenience of explanation. Accordingly, the disclosure is not limited to the terms described below, and other terms having the same technical meanings may be used.

In addition, the disclosure describes various embodiments using terms defined in some communication standards (for example, $3^{rd}$ generation partnership project (3GPP)), but these embodiments are merely examples. Various embodiments of the disclosure may be easily modified and applied to other communication systems.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to." The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

The disclosure generally relates to a wireless communication system, and for example, to an apparatus and a method for reducing a delay of transmission caused by limitations on a HARQ process ID in a wireless communication system. Hereinafter, a wireless communication environment, a radio resource, and a wireless protocol will be described through FIGS. 1A, 1B, 2 and 3 to explain a wireless communication system of the disclosure.

Figure 1B:
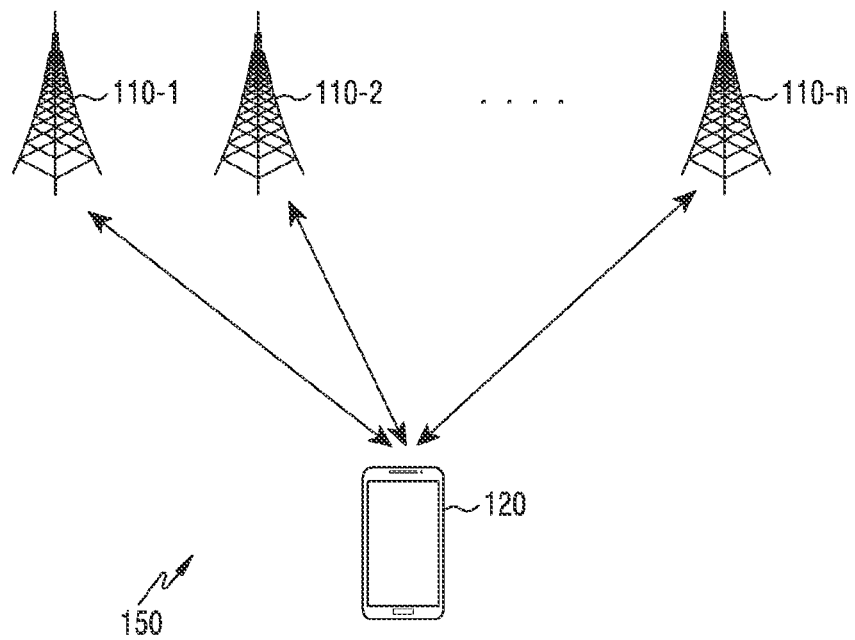

FIGS. 1A and 1B are diagrams illustrating an example of a wireless communication environment according to various embodiments. Referring to FIG. 1A, a base station 110 and a terminal 120 are illustrated as a part of nodes using a wireless channel in a wireless communication system 100. The terminal 120 may be connected with a plurality of base stations. Referring to FIG. 1B, base stations 110-1, 110-2, . . . , 110-n may be connected with the terminal 120 through multiple connectivity (for example, dual connectivity (DC)) in a wireless communication system 150. Hereinafter, operations according to various embodiments will be described with reference to the base station 110, but, for convenience of explanation, descriptions of the base station 110 will be applied to the base stations 110-1, 110-2, . . . , 110-n in the same or similar way.

The base station 110 is a network infrastructure that provides radio access to the terminal 120. The base station 110 has a coverage that is defined as a predetermined (e.g., specified) geographical region based on a distance by which a signal is transmitted. The term 'coverage' used hereinafter may indicate a service coverage area of the base station 110. The base station 110 may cover one cell or may cover multiple cells. Herein, the multiple cells may be distinguished by a supporting frequency, an area of a covering sector.

The base station 110 may be referred to as 'access point (AP),' 'eNodeB (eNB),' '5$^{th}$ generation node (5G node),' '5G node B (NB),' 'next generation node B (gNB),' 'wireless point,' 'transmission/reception point (TRP),' 'distributed unit (DU),' 'radio unit (RU),' 'remote radio head (RRH),' or other terms having the same technical meaning as the above-mentioned terms, in addition to the base station. According to various embodiments, the base station 110 may be connected with one or more 'transmission/reception points (TRPs).' The base station 110 may transmit a downlink signal to the terminal 120 or may receive an uplink signal through the one or more TRPs.

The terminal 120 is a device that is used by a user, and performs communication with the base station 110 through a wireless channel. According to circumstances, the terminal 120 may be operated without user's intervention. That is, at least one of the terminals 120 may be a device that performs machine type communication (MTC), and may not be carried by a user. The terminal 120 may be referred to as 'user equipment (UE),' 'mobile station,' 'subscriber station,' 'customer-premises equipment (CPE),' 'remote terminal,' 'wireless terminal,' 'electronic device,' 'terminal for vehicle,' 'user device,' or other terms having the same technical meaning as the above-mentioned terms, in addition to the terminal.

The dual connectivity (DC) technology, which is a kind of multiple connectivity, was introduced from 3$^{rd}$ generation partnership project (3GPP) standard release 12. Dual connectivity is a technology that connects a terminal to two independent wireless communication cell groups of different kinds or the same kind that have separate radio resource control entities, and enhances frequency using efficiency of the terminal and a base station using frequency resources on component carriers of cells within respective cell groups positioned in different frequency bands in signal transmission and reception. The dual connectivity may be configured by a master cell group which manages a radio resource control state of a terminal with a control plane being directly connected to a core network, and a secondary cell group which interlocks with the master cell group.

The carrier aggregation (CA) technology was introduced in 3GPP standard release 10. CA is a technology that connects a terminal to wireless communication cell groups of the same kind that have a common radio resource control entity, and enhances frequency using efficiency of the terminal and a base station using frequency resources on component carriers of respective cells positioned in different frequency bands in signal transmission and reception, simultaneously.

Research on the dual connectivity technology and the carrier aggregation technology are actively being conducted from the academic aspect due to technical advantages of enhancing efficiency in using limited wireless communication resources of a terminal and limited wireless communication resources of a base station. For example, a 5G mobile communication system adopts, as a basic operating method, a non-stand alone method which operates by interlocking with a 4G core network, and accordingly, the dual connectivity and the carrier aggregation may be utilized as a core technology in commercial services supporting the 5G mobile communication system.

A communication node (for example, a terminal, a base station, an entity of a core network) according to various embodiments of the disclosure may operate in an LTE system. In addition, a communication node (for example, a terminal, a base station, an entity of a core network) according to various embodiments of the disclosure may operate in an NR system. In addition, a communication node (for example, a terminal, a base station, an entity of a core network) according to various embodiments of the disclosure may operate in both an LTE system and an NR system. Explanation of the structures and the layers shown in FIGS. 1A to 3 is merely an example, and any one communication system may not exclude other communication systems.

Figure 2:
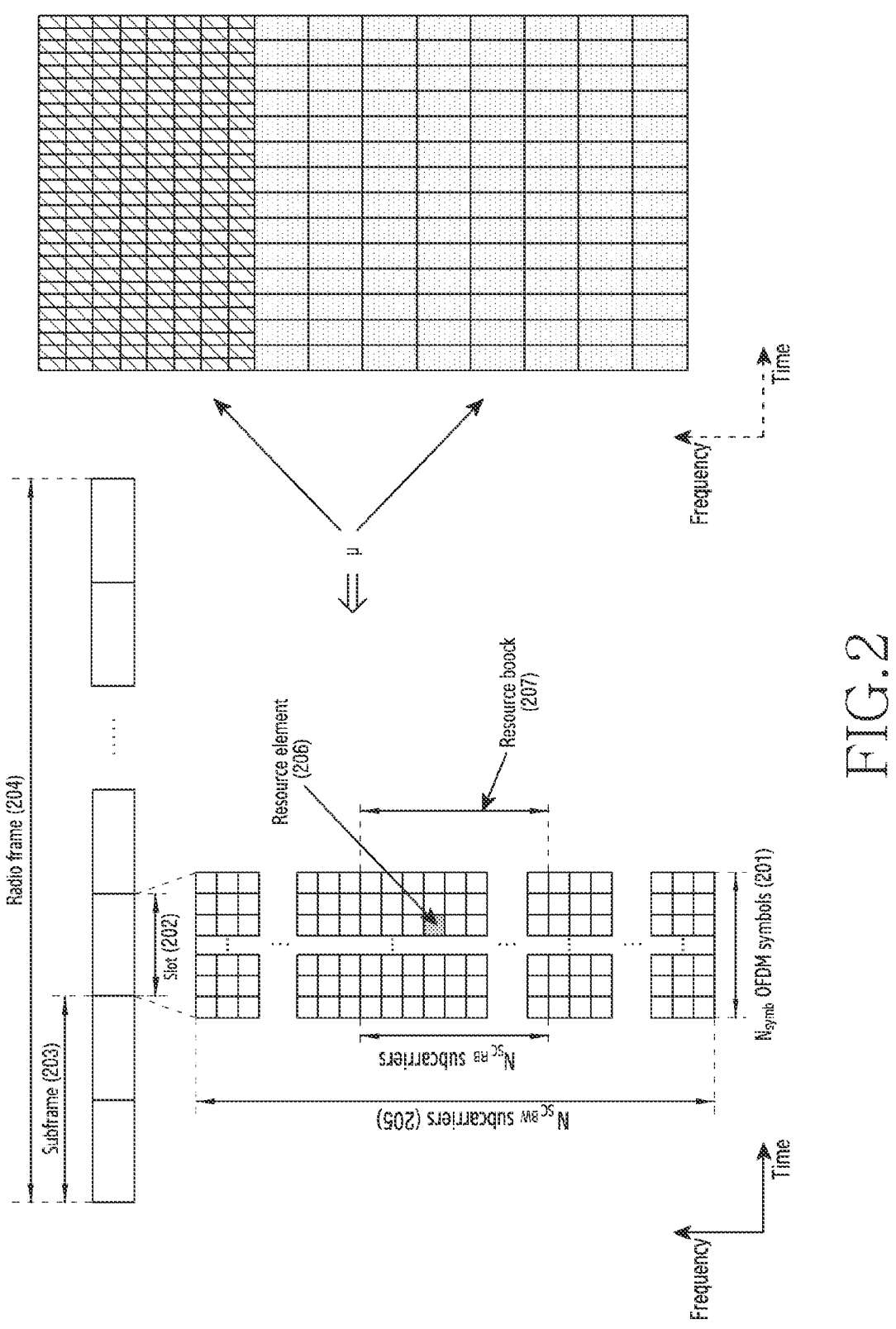
FIG. 2 is a diagram illustrating an example of a radio resource domain of a wireless communication system according to various embodiments.

FIG. 2 is a diagram illustrating an example of a radio resource domain in a wireless communication system according to various embodiments. In various embodiments, the radio resource domain may include a structure of a time-frequency domain. In various embodiments, a wireless communication system may include an LTE communication system or an NR communication system.

Referring to FIG. 2, the horizontal axis on the radio resource domain indicates a time domain, and the vertical axis indicates a frequency domain. A radio frame 204 may be a time domain section that is formed of 10 sub frames 203. A minimum transmission unit in the time domain may be an orthogonal frequency division multiplexing (OFDM) and/or discrete Fourier transform-spread-OFDM (DFT-s-OFDM) symbol, and N$_{symb}$ number of OFDMs and/or DFT-s-OFDM symbols 201 may be gathered, forming one slot 202. In various embodiments, the OFDM symbol may include a symbol regarding a case where a signal is transmitted and received using an OFDM multiplexing method, and the DFT-s-OFDM symbol may include a symbol regarding a case where a signal is transmitted and received using a DFT-s-OFDM or single carrier frequency division multiple access (SC-FDMA) multiplexing method. Hereinafter, in the disclosure, an embodiment regarding the OFDM symbol will be described for convenience of explanation, but this embodiment may be applied to an embodiment regarding the DFT-s-OFDM symbol. A minimum transmission unit in the frequency domain is a subcarrier, and a carrier bandwidth forming a resource grid may be formed of N$_{SC}^{BW}$ number of subcarriers 205 in total. In addition, in the disclosure, an embodiment regarding downlink signal transmission and reception will be described for convenience of explanation, but this embodiment may be applied to an embodiment regarding uplink signal transmission and reception.

In various embodiments, the number of slots 202 forming one sub frame 203, and a length of the slot 202 may vary according to a subcarrier spacing. The subcarrier spacing may be referred to as numerology (μ). That is, the subcarrier spacing, the number of slots included in the subframe, the length of the slot, and a length of the subframe may be variously configured. For example, when a subcarrier spacing (SCS) is 15 kHz in an NR communication system, one slot 202 may form one subframe 203 and lengths of the slot 202 and the subframe 203 may be 1 ms, respectively. In addition, for example, when the subcarrier spacing is 30 kHz, two slots may form one subframe 203. In this case, the length of the slot may be 0.5 ms and the length of the subframe may be 1 ms.

In various embodiments, the subcarrier spacing, the number of slots included in the subframe, the length of the slot, and the length of the subframe may be variously applied according to a communication system. For example, in the case of an LTE system, the subcarrier spacing may be 15 kHz, and two slots may form one subframe. In this case, the length of the slot may be 0.5 ms and the length of the subframe may be 1 ms. In another example, in the case of an NR system, the subcarrier spacing ($\mu$) may be one of 15 kHz, 30 kHz, 60 kHz, 120 kHz, 240 kHz, and the number of slots included in one subframe may be 1, 2, 4, 8, 16 according to the subcarrier spacing ($\mu$).

A basic unit of a resource in the time-frequency domain may be a resource element (RE) 206, and the resource element 206 may be expressed as an OFDM symbol index and a subcarrier index. A resource block may include a plurality of resource elements. In an LTE system, the resource block (RB) (or a physical resource block (PRB)) may be defined by $N_{symb}$ number of continuous OFDM symbols in the time domain, and $N_{SC}^{RB}$ number of continuous subcarriers in the frequency domain. For example, the number of symbols included in one RB may be expressed by $N_{symb}=14$, and the number of subcarriers may be expressed by $N_{SC}^{RB}=12$. In another example, the number of symbols included in one RB may be expressed by $N_{symb}=7$, and the number of subcarriers may be expressed by $N_{SC}^{RB}=12$. The number of RBs ($N_{RB}$) may change according to a bandwidth of a system transmission band. In an NR system, the resource block (RB) 207 may be defined by $N_{SC}^{RB}$ number of continuous subcarriers in the frequency domain. The number of subcarriers may be expressed by $N_{SC}^{RB}=12$. The frequency domain may include common resource blocks (CRBs). A physical resource block (PRB) may be defined in a bandwidth part (BWP) on the frequency domain. CRB and PRB numbers may be determined differently according to a subcarrier spacing.

In an NR and/or LTE system, scheduling information regarding downlink data or uplink data may be delivered from a base station to a terminal through downlink control information (DCI). In various embodiments, the DCI may be defined according to various formats, and each format may indicate whether the DCI includes scheduling information (for example, UL grant) regarding uplink data or includes scheduling information (for example, DL grant) regarding downlink data, whether the DCI is compact DCI having control information of a small size or fall-back DCI, whether spatial multiplexing using multiple antennas is applied, and/or whether the DCI is DCI for controlling power. For example, a DCI format (for example, DCI format 1_0 of NR) which includes scheduling control information (DL grant) regarding downlink data may include at least one piece of information of following control information. NR DCI format 1_0 may include scheduling regarding downlink data.

DCI format identifier: Identifier for identifying a format of DCI;

Frequency domain resource assignment: indicating an RB assigned to data transmission;

Time domain resource assignment: indicating a slot and a symbol which are assigned to data transmission;

VRB-to-PRB mapping: indicating whether virtual resource block (VRB) mapping is applied;

Modulation and coding scheme (MCS): indicating a modulation scheme used for data transmission and a size of a transport block which is data to be transmitted;

New data indicator (NDI): indicating whether transmission is HARQ initial transmission or retransmission;

Redundancy version (RV): indicating a redundancy version of HARQ;

HARQ process number: indicating a process number of HARQ;

PDSCH assignment information (downlink assignment index): indicating the number of PDSCH reception results that should be reported to a base station by a terminal (for example, the number of HARQ-ACKs);

Transmit power control (TPC) command for physical uplink control channel (PUCCH): indicating a transmit power control command for a PUCCH which is an uplink control channel;

PUCCH resource indicator: indicating a PUCCH resource used for reporting HARQ-ACK including a reception result regarding a PDSCH configured through corresponding DCI; and PUCCH transmission timing indicator (PDSCH-to-HARQ_feedback timing indicator): indicating slot or symbol information by which a PUCCH for reporting HARQ-ACK including a reception result regarding a PDSCH configured through corresponding DCI should be transmitted.

The DCI may undergo channel coding and modulation processes and may be transmitted on a physical downlink control channel (PDCCH) (or control information, hereinafter, they are interchangeably used) or an enhanced PDCCH (EPDCCH) (or enhanced control information, hereinafter, they are interchangeably used), which is a downlink physical control channel. In the following description, transmission and reception of the PDCCH or EPDCCH may be understood as DCI transmission and reception on the PDCCH or EPDCCH, and transmission and reception of a physical downlink shared channel (PDSCH) may be understood as downlink data transmission and reception on the PDSCH.

In various embodiments, cyclic redundancy check (CRC), which is scrambled into a specific radio network temporary identifier (RNTI) (or a terminal identifier C-RNTI) independent for each terminal, may be added to the DCI, and the DCI regarding each terminal may be channel-coded and then may be configured as an independent PDCCH and may be transmitted. In the time domain, the PDCCH may be transmitted during a control channel transmission period. A mapping position of the PDCCH in the frequency domain may be determined by at least an identifier (ID) of each terminal, and may be transmitted in some of total system transmission bands or system transmission bands.

Downlink data may be transmitted on a physical downlink shared channel (PDSCH) which is a physical channel for transmitting downlink data. The PDSCH may be transmitted after a control channel transmission period, and a mapping position of the PDSCH in the frequency domain, scheduling information like a modulation scheme regarding the PDSCH may be determined based on DCI which is transmitted through the PDCCH.

Through the modulation coding scheme (MCS) in the control information of the DCI, a base station may notify a terminal of a modulation scheme applied to a PDSCH to be transmitted, and a size of data to be transmitted (transport block size (TBS)). In various embodiments, the MCS may be formed 5 bits or more or less. The TBS may correspond to a size of a TB before channel coding for error correction is applied to a transport block the base station intends to transmit.

In an NR system, a modulation scheme supported to transmit downlink data may include at least one of quadrature phase shift keying, 16 quadrature amplitude modulation (16QAM), 64QAM, 256QAM, and each modulation order (Q_m) may be 2, 4, 6, 8. For example, in the case of the QPSK modulation, 2 bits may be transmitted per symbol. In the case of the 16QAM modulation, 4 bits may be transmitted per symbol. In the case of the 64QAM modulation, 6 bits may be transmitted per symbol. In the case of the 256QAM modulation, 8 bits may be transmitted per symbol. In addition, a modulation scheme of 256 QAM or higher may be used according to a system deformation.

Various embodiments of the disclosure will be described based on an LTE communication system or an NR communication system, but contents of the disclosure are not limited thereto and may be applied to various wireless communication systems using a retransmission technique. In addition, contents of the disclosure may be applied to a non-licensed band in addition to a licensed band according to necessity.

The disclosure described hereinbelow relates to a signal delivery method whereby a higher layer signaling or a higher signal is delivered from a base station to a terminal using a downlink data channel of a physical layer, or is delivered from a terminal to a base station using an uplink data channel of a physical layer, and may include at least one of signal delivery methods of delivering through radio resource control (RRC) signaling, packet data convergence protocol (PDCP) signaling, or media access control (MAC) control element (MAC CE). In addition, a higher layer signaling or a higher signal may include system information transmitted to a plurality of terminals in common, for example, a system information block (SIB).

Figure 3:
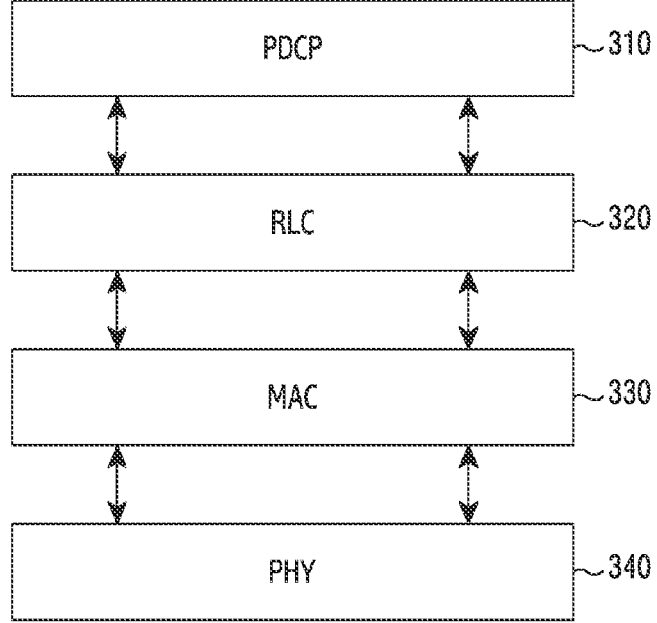
FIG. 3 is a diagram illustrating an example of a structure of a wireless protocol in a wireless communication system according to various embodiments.

FIG. 3 is a diagram illustrating an example of a structure of a wireless protocol of a wireless communication system according to various embodiments. The structure of the wireless protocol illustrated may be a structure of a wireless protocol of an LTE or NR communication system.

Referring to FIG. 3, the wireless protocol includes a PDCP layer 310, an RLC layer 320, a MAC layer 330, a PHY layer 340 in a terminal and a base station. In the case of an NR system, the wireless protocol may further include an SDAP layer for QoS management although it is not illustrated in FIG. 3.

Example functions of the PDCP layer 310 may include some of the following functions:

Header compression and decompression: ROHC only;
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in uplink.

In the above functions, reordering of a PDCP device refers to a function of reordering PDCP PDUs received on a lower layer in sequence based on a PCDP sequence number (SN). Reordering of the PDCP device may include a function of delivering data to a higher layer in a reordered sequence, may include a function of directly delivering without considering a sequence, may include a function of reordering and recording missed PDCP PDUs, may include a function of reporting a state of missed PDCP PDUs to a transmission side, and may include a function of requesting retransmission for the missed PDCP PDUs.

Example functions of the RLC layer 320 may include some of the following functions:

Transfer of upper layer PDUs;
In-sequence delivery of upper layer PDUs;

Out-of-sequence delivery of upper layer PDUs;
Error correction through ARQ;
Concatenation, segmentation and reassembly of RLC SDUs;
Re-segmentation of RLC data PDUs;
Reordering of RLC data PDUs;
Duplicate detection;
Protocol error detection
RLC SDU discard; and
RLC re-establishment.

In the above-described functions, in-sequence delivery of an RLC device may refer to a function of delivering RLC SDUs received from a lower layer to a higher layer in sequence. When one RLC SDU is divided into a plurality of RLC SDUs and is received, the in-sequence delivery of the RLC device may include a function of reassembling the RLC SDUs and delivering the same.

The in-sequence delivery of the RCL device may include a function of reordering received RLC PDUs with reference to an RLC sequence number (SN) or a PDCP sequence number (SN), may include a function of reordering and recording missed RLC PDUs, may include a function of reporting a state regarding the missed RLC PDUs to a transmission side, and may include a function of requesting retransmission for the missed RLC PDUs.

The in-sequence delivery of the RLC device may include a function of delivering only RLC SDUs before missed RLC SDUs to a higher layer in sequence when there are the missed RLC SDUs. In addition, the in-sequence delivery of the RLC device may include a function of delivering all RLC SDUs received before a timer starts to a higher layer in sequence when a predetermined timer expires even if there are missed RLC SDUs. In addition, the in-sequence delivery of the RLC device may include a function of delivering all RLC SDUs received up to a present time to a higher layer in sequence when the predetermined timer expires even if there are missed RLC SDUs.

The RLC device may process RLC PDUs in the order that they are received, regardless of a sequence of a sequence number (out-of-sequence delivery), and may deliver the RLC PDUs to a PDCP device. When the RLC device receives a segment, the RLC device may receive segments stored in a buffer or segments to be received thereafter, and may reconfigure one complete RLC PDU, and then, may deliver the same to the PDCP device.

The RLC layer 320 may not include a concatenation function, and may perform a function on the MAC layer 330 or may substitute with a multiplexing function of the MAC layer.

In the above-described functions, the out-of-sequence delivery of the RLC device may refer to a function of directly delivering RLC SDUs received from a lower layer to a higher layer regardless of a sequence. The out-of-sequence delivery of the RLC device may include a function of, when one RLC SDU is segmented into a plurality of RLC SDUs and is received, reassembling the RLC SDUs and delivering the same. The out-of-sequence delivery of the RLC device may include a function of storing an RLC SN or PDCP SN of the received RLC PDUs, ordering, and recording missed RLC PDUs.

The MAC layer 330 may be connected with various RLC layer devices configured in one terminal, and example functions of the MAC may include some of the following functions:

Mapping between logical channels and transport channels;
Multiplexing/demultiplexing of MAC SDUs;

Scheduling information reporting;

Error correction through HARQ;

Priority handling between logical channels of one UE;

Priority handling between UEs by means of dynamic scheduling;

MBMS service identification;

Transport format selection; and

Padding.

The PHY layer 340 may perform operations of performing channel coding and modulation with respect to higher layer data (data corresponding to a MAC PDU), and making an OFDM symbol and transmitting the same through a wireless channel, or demodulating an OFDM symbol received through a wireless channel and performing channel decoding and delivering the OFDM symbol to a higher layer. In this case, data received from the MAC layer 330 which is a higher layer may be referred to as a transport block (TB).

An existing wireless communication network system including 4G to 5G communication systems described above utilizes basic technologies such as retransmission techniques and error correction encoding on various layers in order to achieve delivery reliability between communication devices such as a base station and a terminal. The above-described technologies may be redundantly used on various layers by a single or a combination of a plurality of techniques on various layers within a system. This may refer, for example, to a plurality of retransmission procedures being implemented redundantly and differently according to each layer in one communication system.

Standard institutes represented by 3GPP apply this communication philosophy as it is, and define retransmission procedures having different characteristics with respect to a plurality of layers. The standard institutes employ not only a feedback-based retransmission procedure which is based on automatic retransmission request (ARQ), but also a hybrid ARQ (HARQ) technology which combines ARQ and an error correction encoding technology, and delivers different or same information or a bit corresponding thereto when retransmitting, and restores information that is originally intended to be transmitted, by combining information or bits received in response to a plurality of transmissions.

The HARQ technique requires a terminal to identify that a group of a plurality of pieces of information or bits received is based on the same data information, and this brings necessity of an indicator for informing that each retransmission process is used for restoring the same data. Such an indicator may be referred to as an HARQ indication (HARQ ID), and the HARQ ID may operate as an indicator for allowing a terminal and a base station to recognize the same data unit or information, and may inform the terminal that newly received retransmission information should be combined with information bits previously received through the same HARQ ID. The HARQ ID may be referred to as a HARQ process ID. Such an HARQ technique may be performed on the MAC layer 330 as described above.

A MAC entity managing the HARQ process may include an HARQ entity for each serving cell. The HARQ entity is an entity for managing HARQ processes in parallel, and may provide data received at a DL-SCH, that is, HARQ information related to TBs, to a corresponding HARQ process. The HARQ information may include a new data indicator (NDI), a transport block size (TBS), a redundancy version (RV), and an HARQ process ID. The HARQ information may be delivered through the DCI of the physical layer 340 as described above. Hereinafter, the HARQ process will be used as an expression representing a buffer (for example, a soft buffer) of the MAC layer utilized in a communication protocol to transmit a physical layer transmission signal, and will be used as an expression representing components of the same or similar concept.

Communication systems utilize a technology for increasing a bandwidth during transmission by combining a plurality of carriers (carrier aggregation, hereinafter, CA). Such a CA technology combines a plurality of frequency elements and utilizes the same for communication with a terminal, thereby enabling an individual terminal to have a higher data throughput. An area of a terminal that is responsible for frequency elements which serves as a base of operations may be referred to as PCell, SpCell, PSCell, etc., and an area of an additional frequency element which is dependently utilized in addition to the basic frequency elements may be referred to as SCell. The PSCell refers to a PCell of a secondary node (SN), and the SpCell refers to a PCell and a PSCell. The SCell refers to a cell other than a SpCell.

In the case of the above-described CA technology, success or failure to receive downlink transmit data of each SpCell and SCell should be delivered from the terminal to the base station in the form of HARQ ACK/NACK. In this case, the ACK/NACK information may be combined and delivered through a certain cell, other than each cell to which the downlink transmission data is transmitted. For example, HARQ ACK/NACK information regarding the SpCell and one or more SCells may be delivered through a physical uplink control channel (PUCCH) of SpCell. HARQ ACK/NACK information may be multiplexed with PUSCH transmission of the SpCell or a certain SCell, and may be delivered. In addition, for example, HARQ ACK/NACK information may be delivered through a SCell in which a PUCCH is configured.

When the CA technology is utilized by the HARQ ACK/NACK delivery method in the above-described CA technology, there may be a delay for exchanging information between a cell to which HARQ ACK/NACK information comes up and a cell where downlink transmission indicated by the corresponding information occurs. For example, there may be a delay on a backhaul network regarding cells. Due to physical separation between a cell to which HARQ ACK/NACK information is delivered and a cell to which downlink transmission is provided, there may be an information delay occurring in a backhaul network between two cells. This may occur when a CA operation is configured between devices having a meaningful delivery delay in delivering information, not in one processor or device. For example, in the case of an NR communication system, numerology may be different between cells. As mentioned above through FIG. 2, as numerology is configured differently between cells, an absolute length may be different between the two cells even if the number of symbols or the number of slots is the same. For example, as there is a difference in an absolute length between a transmission unit of a channel for transmitting real data and a transmission unit of a feedback channel, HARQ-ACK information on data of an HARQ process may arrive at the base station later than expected by the base station.

Due to such a delay, a cell that fails to receive the HARQ ACK/NACK information does not cause a change in operations to the HARQ process which is mapped onto a corresponding HARQ ID until it is identified whether ACK/NACK on corresponding downlink transmission is received, and may use a retransmission bit combination according to a HARQ method. Thereafter, when the base station receives NACK information in the corresponding cell, the base station may retransmit a bit which is the same as or different from a previous bit, and the terminal may operate to decipher an original signal by combining previously delivered information and newly received information with the corresponding HARQ ID. For example, the terminal may obtain a combining gain by combining retransmission data received on the same HARQ process with data of a soft buffer (data received at a corresponding HARQ process), and decoding.

However, in order to obtain a gain by an HARQ operation in the above-described operation, new data (or a transport block (TB)) should not be delivered to the HARQ process corresponding to the HARQ ID in which transmission and retransmission procedures are in progress until retransmission succeeds or the number of retransmissions reaches a predetermined maximum value, and this may put restrictions on the transmission procedure due to a shortage of HARQ ID even when there are a radio resource of downlink transmission and information to be transmitted, because of restrictions on the number of HARQ IDs and the delay in transmission of ACK/NACK in the CA environment mentioned above. The restrictions on the transmission may increases the number of lost transmission opportunities as the delay in transmission of information between two devices which are targets of CA is longer, and eventually, results in very linear data throughput degradation. In other words, the restrictions on the number of HARQ IDs may cause restrictions on the number of transmissions that a communication system using a HARQ technique may transmit using the HARQ technique, and the restrictions may affect a transmission window size through which the base station may continuously transmits without a HARQ response. That is, the restrictions on the number of HARQ IDs may affect a transmission window size in base station-terminal communication, and, when a time delayed until a HARQ response is received and processed from a time of transmission is longer than a time spent to process data through the transmission window size, it may be impossible to transmit data due to the lack of the transmission window size.

Transmission Opportunity-Based HARQ Process Technique

In order to address the above-described problems, various embodiments of the disclosure provide a new HARQ process technique for reducing a loss caused by a delay, instead of a HARQ process technique for acquiring a combining gain (a gain obtained by a bit combination). In the disclosure, as a method for addressing a shortage of HARQ ID which occurs to restore data through a bit combination at a reception end through an operation of HARQ, an existing HARQ process procedure may be adaptively maintained or a separate procedure described in the disclosure may be utilized. In the disclosure, a MAC PDU (or TB) managed in a corresponding HARQ process for an existing HARQ operation is removed, such that an existing retransmission procedure is not followed, and, when a transmission opportunity comes, a HARQ process technique between a base station and a terminal may be operated through a procedure of transmitting a PDU (or TB) which is substituted in a corresponding HARQ process. By following a separate retransmission procedure, e.g., a separate HARQ process, the HARQ process technique between the base station and the terminal may be operated. In other words, the newly disclosed HARQ process technique may not operate as an ARQ procedure in a system supporting Hybrid ARQ, or may not apply a procedure of an existing HARQ process (same HARQ ID-based retransmission management procedure).

An existing retransmission procedure to be replaced in a HARQ technique (hereinafter, a transmission opportunity-based HARQ technique) according to various embodiments of the disclosure will be described based on a procedure shown in FIGS. 4A, 4B and 4C (which may be referred to as FIGS. 4A to 4C).

Figure 4A:
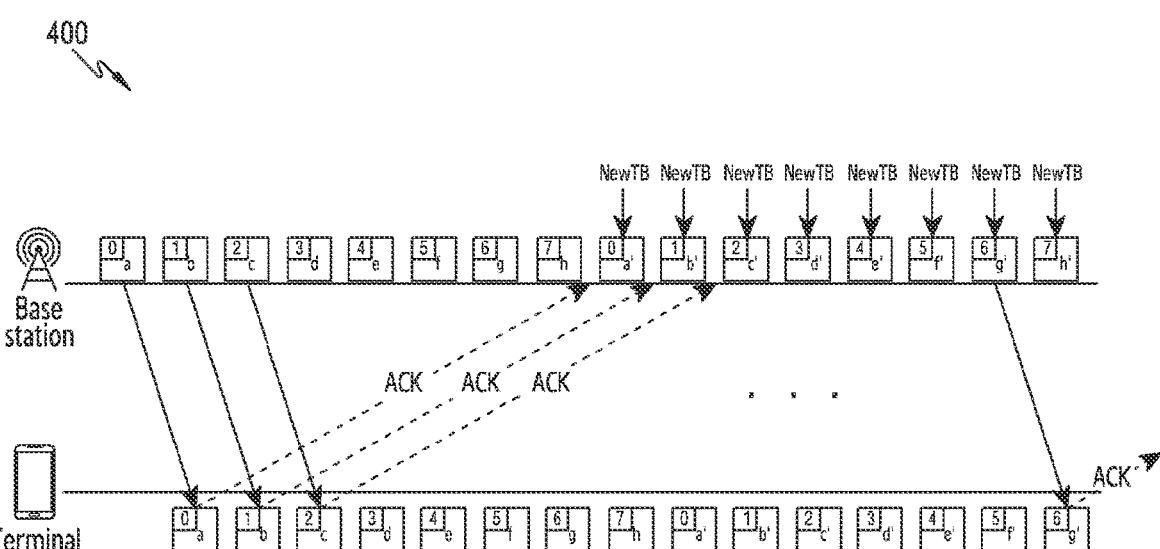
FIGS. 4A, 4B and 4C are diagrams illustrating examples of an existing hybrid automatic request (HARQ) process technique according to various embodiments.
Figure 4B:
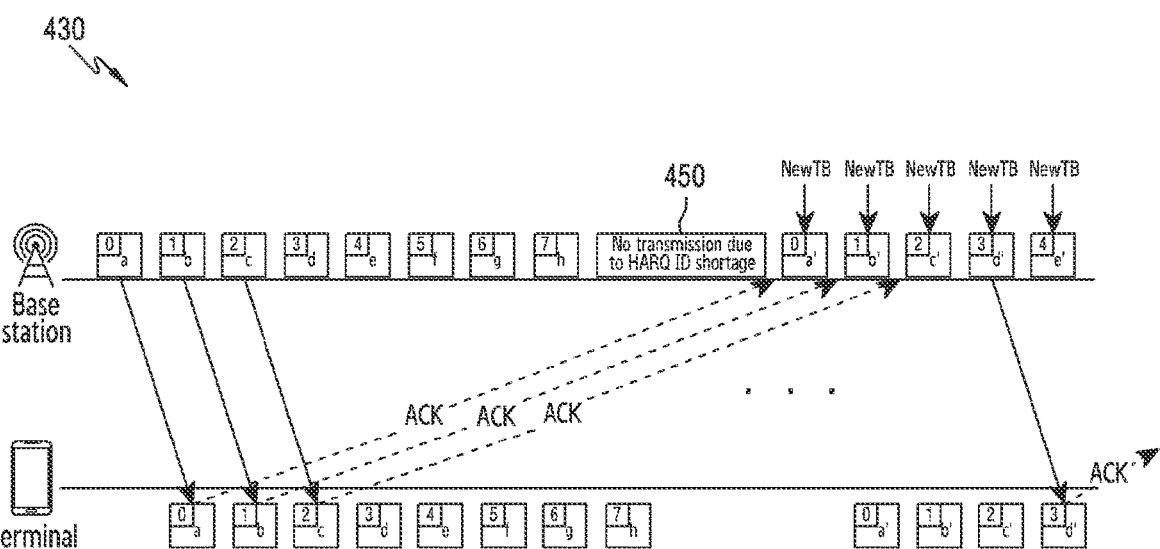
Figure 4C:
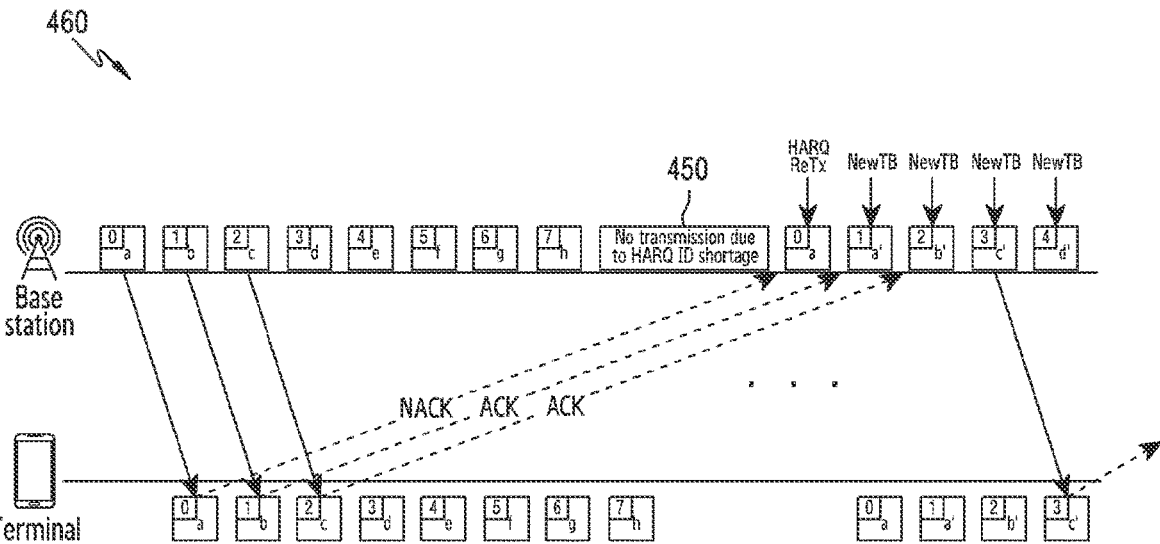

FIGS. 4A to 4C are diagrams illustrating examples of an existing HARQ process technique according to various embodiments. A base station is illustrated by the base station 110 of FIG. 1, and a terminal is illustrated by the terminal 120 of FIG. 1. According to the existing HARQ process technique shown in FIGS. 4A to 4C, each HARQ process may be used so as not to insert new data into a corresponding HARQ process and not to transmit newly until transmission is performed a restricted number of times or ACK information on data transmitted in each HARQ process is received.

Referring to FIG. 4A, a situation 400 of a base station and a terminal which follow an existing HARQ process technique without causing a delay problem is illustrated. A situation where 8 HARQ processes in total are operated is illustrated by way of an example. Operations of the base station and the terminal when they are in an environment where an existing system operation is ideally operated are illustrated. After first transmission starts in each HARQ process, the base station may receive ACK/NACK information on each HARQ process and may identify the same, and may perform transmission and retransmission procedure accordingly. This embodiment is an embodiment when operations are performed with the number of HARQ processes determined by standards without a problem, and operations between the base station and the terminal in a normal single band communication or low delay carrier aggregation communication environment are illustrated. After first data (a) of HARQ process #0 is transmitted, feedback (ACK) on the first data (a) of HARQ process #0 arrives before all available HARQ processes are exhausted, and accordingly, the base station may generate second data (a') of HARQ process #0 based on the feedback and may transmit the second data to the terminal. When feedback is NACK, the base station may generate the second data of HARQ process #0 based on the first data (a), and may transmit the second data to the terminal, although this is not illustrated in FIG. 4A.

In the environment operating as shown in FIG. 4A, there is no problem that should be addressed through embodiments of the disclosure, and in the above-described environment, restraining from operating an embodiment (transmission opportunity-based HARQ process technique) of the disclosure, which will be described below, may be given priority. Detecting a situation where a delay problem does not arise and performing an existing HARQ process technique may also be understood as an embodiment of the disclosure.

FIGS. 4B and 4C illustrate situations 430, 460 of a base station and a terminal which perform an existing HARQ process technique with a delay problem 450. A situation where 8 HARQ processes in total are operated is illustrated by way of an example. Compared to the environment of FIG. 4A, an environment where there is a problem of a shortage of HARQ ID occurring in an existing system operation and performance degradation resulting therefrom occurs is illustrated. FIG. 4B illustrates a procedure when there is no retransmission request from a reception terminal, and FIG. 4C illustrates a procedure when there is a retransmission request from a reception terminal. For example, operations of a base station and a terminal in an existing system that are performed when time-frequency basic units in respective bands in carrier aggregation are different or a delay in information delivery between two areas processing combined two bands is relatively long are illustrated.

Each HARQ process is set so as not to insert new data into a corresponding HARQ process until ACK information on target data transmitted first is received or the number of retransmissions reaches a determined number, and operates to acquire a HARQ combining gain. Accordingly, due to the operation for acquiring the HARQ combining gain and the delay until ACK information is received, a transmission procedure through a corresponding resource is not initiated due to a shortage of the number of HARQ processes even through there are time-frequency resources for transmission, and as a result, a problem that a throughput of the system is reduced arises. For example, as shown in FIGS. 4B and 4C, after transmitting first data (a) of HARQ process #0, the base station may await until feedback on the first data (a) of HARQ process #0 arrives. Due to the shortage of the HARQ ID, there may be no additional data transmission after HARQ process #7. Since feedback on the first data (a) does not arrive after data transmission of HARQ process #7, a delay 450 may occur in transmission of the base station. After the delay 450, the base station may receive feedback. According to whether the feedback is ACK (FIG. 4B) or NACK (FIG. 4C), data to be included in HARQ process #0 may be determined. When the feedback is ACK, the base station may generate new data (a') as second data of HARQ process #0, and may transmit the second data to the terminal. When the feedback is NACK, the base station may generate second data of HARQ process #9 based on the first data (a), and may transmit the second data to the terminal.

In order to address problems occurring in FIGS. 4B and 4C, various embodiments of the disclosure provide a method which does not follow a retransmission procedure for an existing HARQ operation. Performing the procedure of FIGS. 4B, 4C, which is an existing HARQ process technique, as it is in order to obtain a combining gain even when a problem of a delay occurs may also be understood as an embodiment of the disclosure. In this case, a combining gain may be acquired instead of a delay.

In order not to follow the retransmission procedure according to existing HARQ, the base station may insert second transmission data to the HARQ process that performs first transmission or retransmission with first transmission data being inserted before, but does not still receive ACK/NACK information. For example, the base station may add second transmission data to a corresponding HARQ process when a transmission opportunity comes. Existing first transmission data may not be utilized in the corresponding HARQ process. Due to the restrictions on the maximum number of HARQ processes, a delay occurs when a response (HARQ ACK information) of the corresponding HARQ process is awaited, although there is data to be transmitted. To prevent and/or reduce this, the base station according to various embodiments may configure data to be transmitted through the HARQ process, that is, a TB, irrespective of HARQ ACK information on the HARQ process. In other words, the base station may deliver a new TB to the terminal based on the HARQ process when a transmission opportunity of the HARQ process comes even if a response of the corresponding HARQ process is not received. Hereinafter, the transmission opportunity-based HARQ process technique according to various embodiments of the disclosure will be described through example operations of FIGS. 5, 6 and 7.

Figure 5:
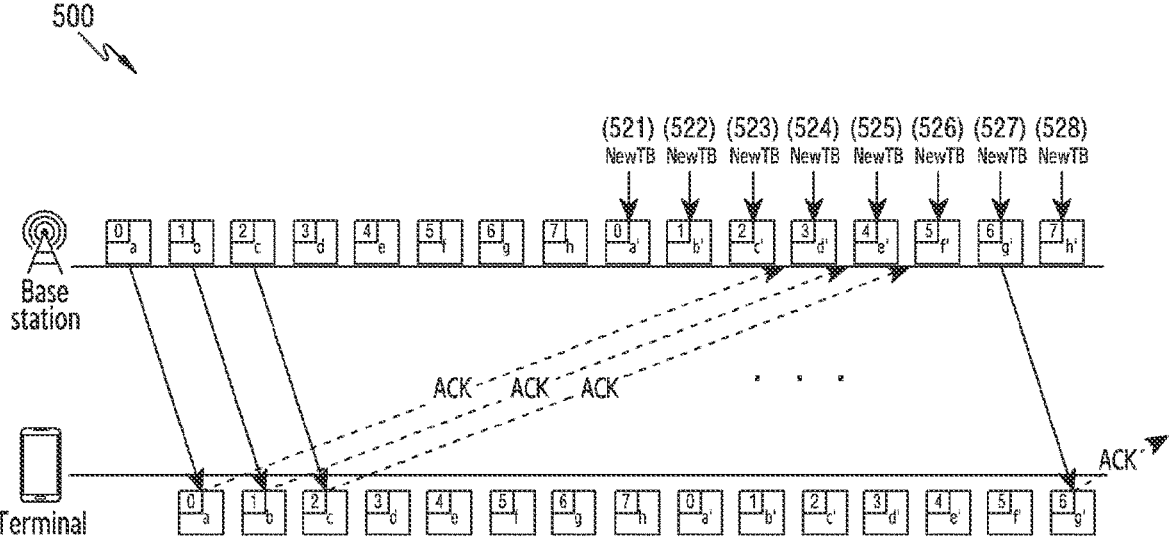
FIG. 5 is a diagram illustrating an example of a transmission opportunity-based HARQ technique according to various embodiments.

FIG. 5 is a diagram illustrating an example of the transmission opportunity-based HARQ technique according to various embodiments. A base station is illustrated by the base station 110 of FIG. 1, and a terminal is illustrated by the terminal 120 of FIG. 1. In the corresponding embodiment, it is assumed that 8 HARQ processes in total are supported. As a method of avoiding performance degradation caused by a problem of a shortage of HARQ ID occurring in an existing system, a procedure of transmitting independently from delayed ACK/NACK information is illustrated.

Referring to FIG. 5, a situation 500 in which HARQ information (ACK/NACK/DTX) on HARQ processes still in use is not received after transmission is continuously performed 8 times using HARQ process #0 to HARQ process #7 is illustrated. HARQ information which is feedback on transmission by HARQ process #0 to HARQ process #7 is not received before a next transmission time of each HARQ process. In a state where feedback of HARQ process #i is not received, a transmission opportunity of the HARQ process #i comes. Accordingly, the base station may configure data (e.g., a TB) to be inserted into the HARQ process according to the transmission opportunity-based HARQ process technique. The base station may configure transmission data to be included in the HARQ process irrespective of feedback of previous transmission data of the HARQ process (that is, without considering feedback) when configuring transmission data to be included in the HARQ process. In other words, even when feedback information is not received, the base station may configure transmission data irrespective of whether transmission of previous transmission data succeeds or fails.

Data of HARQ process #0 may be configured with a new first TB 521 (a'). Data of HARQ process #1 may be configured with a new second TB 522 (b'). Data of HARQ process #2 may be configured with a new third TB 523 (c'). Data of HARQ process #3 may be configured with a new fourth TB 524 (d'). Data of HARQ process #4 may be configured with a new fifth TB 525 (e'). Data of HARQ process #5 may be configured with a new sixth TB 526 (f'). Data of HARQ process #6 may be configured with a new seventh TB 527 (g'). Data of HARQ process #7 may be configured with a new eighth TB 528 (h').

As mentioned in FIG. 4B or 4C, according to an existing HARQ process technique, new data may not be transmitted until feedback on first data (a) of HARQ process #0 is received. However, according to the transmission opportunity-based HARQ technique according to various embodiments of the disclosure, the base station may transmit new data to the terminal as second data of HARQ process #0 even before feedback on the first data (a) of HARQ process #0 is received. That is, the base station may insert a TB (a') which is second transmission data to HARQ process #0 through which a TB (a) of the first transmission data is transmitted, and may transmit the corresponding TB (a').

The base station may toggle a new data indicator (NDI) bit so as to indicate that data to be transmitted through the corresponding HARQ process is new data, in order to transmit the second transmission data, and may notify the reception terminal that the second transmission data is not retransmission of the first transmission data. For example, the terminal may not combine the second transmission data and the first transmission data, and may not decode. The base station may expect the terminal to delete contents related to the first transmission data of HARQ process #0 into which the first transmission data is inserted, and to newly insert contents on the second transmission data. For example, the terminal may delete the contents related to the first transmission data from a soft buffer, and may include the contents on the second transmission data in the corresponding soft buffer. The terminal may receive the new TB (a') regarding HARQ processor #0, and may store the new TB (a'). The above-described operations are related to a method for configuring a transmission procedure without an HARQ operation in a system which is based on an HARQ operation, and have been described based on a 3GPP system, and the above-described respective elements may be substituted with other elements which have the same or similar concepts according to a system, and may be configured.

The above-described operations (operations according to the transmission opportunity-based HARQ procedure) may be managed to be applied only to some HARQ processes, along with an HARQ process management technique, which will be described below, or may be applied to all HARQ processes. Such an HARQ technique may reduce a delay caused by restrictions on the number of HARQ process IDs, and may define an HARQ procedure applied when second transmission data of a corresponding HARQ process occurs before ACK/NACK information on first transmission data is received. The rule which puts restrictions so as to insert second transmission data after ACK information is received in order to acquire a bit combining gain by the same HARQ process is extended to be applied before ACK/NACK information is received, and the base station may transmit data without restrictions for HARQ operations, so that a problem caused by restrictions on the number of HARQ process IDs may be addressed.

Retransmission Technique of Transmission Opportunity-Based HARQ

Since ACK on first transmission data regarding each HARQ process is received, retransmission is not required and operations are performed without a problem. However, when feedback on a TB of an HARQ process is NACK, it may refer, for example, to the terminal not having successfully acquired the corresponding TB, and therefore, the base station is required to retransmit bits corresponding to the transmitted TB irrespective of physical processing (for example, although an NDI or RV of HARQ information indicates new data). Hereinafter, a retransmission technique which does not utilize a HARQ combining gain and is used in combination with HARQ will be described.

A HARQ non-application transmission procedure in a system which uses the above-described HARQ process may occur by inserting new second transmission data to a corresponding process after a transmission procedure of first transmission data utilizing an existing HARQ process is performed. However, in this case, when the operation is performed only by inserting existing data, retransmission of first transmission data which is replaced on a corresponding layer (generally, a MAC layer) may not be expected, and this may refer, for example, to success in transmission of the corresponding data depending on restoration by a retransmission procedure on a higher layer (generally, an RLC layer (for example, the RLC layer 320 of FIG. 3) or a PDCP layer (for example, the PDCP layer 310 of FIG. 3). That is, even when transmission of the first transmission data which has been transmitted in an HARQ process fails and NACK information on the corresponding transmission arrives at the HARQ process, retransmission on the corresponding layer may be impossible and there may be no choice but to expect a restoration procedure performed from a higher layer.

In order to mitigate or address the above-described problem, the disclosure provides a method of replacing a retransmission procedure on first transmission data according to an existing operation through a separate retransmission procedure, in the above-described process of delivering second transmission data to an HARQ process and deleting first transmission data on which ACK/NACK information is awaited according to a HARQ procedure. This is because, when retransmission is performed through an existing procedure on a higher layer, an overhead may increase due to a delay and retransmission. That is, embodiments of the disclosure provide a procedure for performing a retransmission procedure on a corresponding layer when NACK information is received at a MAC entity, as a solution to difficulty in performing a retransmission procedure on a higher layer at a time when NACK information is received. Hereinafter, specific examples will be described through FIGS. 6 and 7.

Figure 6:
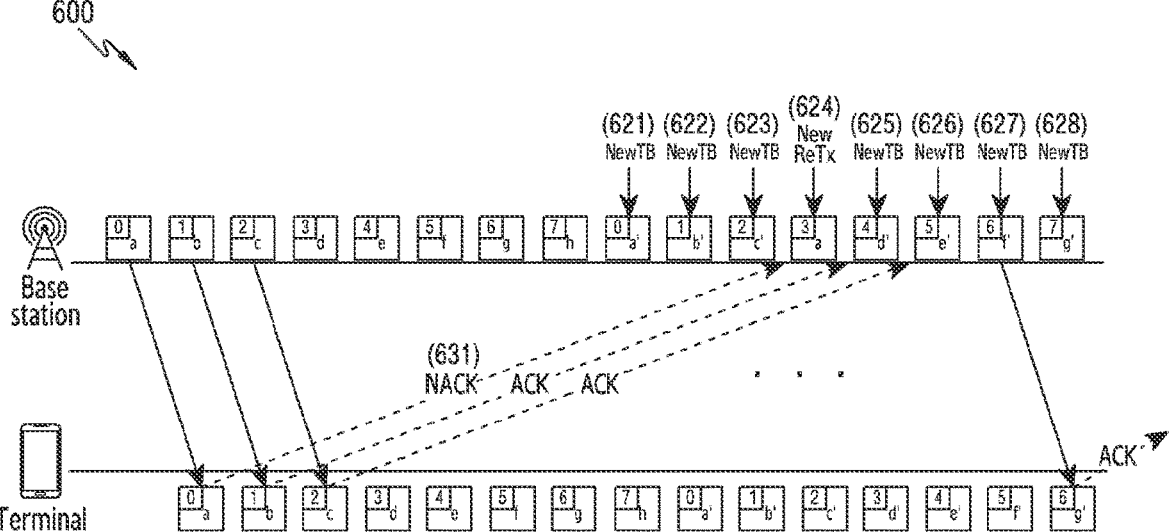
FIG. 6 is a diagram illustrating an example of retransmission of a transmission opportunity-based HARQ procedure according to various embodiments.

FIG. 6 is a diagram illustrating an example of retransmission of the transmission opportunity-based HARQ procedure according to various embodiments of the disclosure. A base station is illustrated by the base station 110 of FIG. 1, and a terminal is illustrated by the terminal 120 of FIG. 1. In a corresponding embodiment, it is assumed that 8 HARQ processes in total are supported, and a situation where HARQ information (ACK/NACK/DTX) on HARQ processes still in use is not received after transmission is continuously performed 8 times using HARQ process #0 to HARQ process #7 is illustrated. As a method for avoiding performance degradation caused by a problem of a shortage of HARQ ID occurring in an existing system, a procedure for performing retransmission according delayed NACK information according to an embodiment is illustrated.

Referring to FIG. 6, a situation 600 where feedback on first transmission data (a) of HARQ process #0 is NACK is illustrated. When feedback 631 on the first transmission data (a) of HARQ process #0 is NACK, the base station may identify a HARQ process to come after the corresponding feedback is received. For example, the base station may identify HARQ process #3. Since the base station should retransmit a TB(a) which is the first transmission data, the base station may insert the TB (a) as second transmission data of HARQ process #3. The base station may transmit the TB (a) based on HARQ process #3.

Data of HARQ process #0 may be configured with a new first TB 621 (a'). Data of HARQ process #1 may be configured with a new second TB 622 (b'). Data of HARQ process #2 may be configured with a new third TB 623 (c'). Data of HARQ process #3 may be configured with a fourth TB 624 corresponding to the existing TB (a). Data of HARQ process #4 may be configured with a new fifth TB 625 (e'). Data of HARQ process #5 may be configured with a new sixth TB 626 (f'). Data of HARQ process #6 may be configured with a new seventh TB 627 (g'). Data of HARQ process #7 may be configured with a new eighth TB 628 (h'). The terminal may expect to receive new data, but really transmitted data (TB 624) may correspond to the first transmission data of HARQ process #0. That is, transmission data may be new data from the viewpoint of the terminal, but may correspond to pre-transmitted data from the viewpoint of the base station.

Since contents of a real TB are configured independently from an HARQ process ID, the base station may need to manage information regarding which HARQ process is related to data (MAC SDU or RLC PDU) received on a MAC layer. The base station may determine whether to retransmit the TB or to transmit a new TB, based on received feedback (ACK/NACK/NACK) information irrespective of the terminal (transparent). The base station may expect the terminal to always recognize the corresponding TB as new data. For example, the base station may manage retransmission independently from the HARQ process on the MAC layer. The base station may transmit information that the base station intends to really transmit to the terminal, by retransmitting transmission data based on feedback information of the terminal, without a retransmission procedure on a higher layer (for example, ARQ of RLC). An HARQ process of feedback information and an HARQ process of retransmitted transmission data may be independent from each other, and may be configured differently. The base station may transmit data that it really intends to transmit without a delay even if the terminal does not know retransmission and does not acquire a combining gain.

For example, according to various embodiments of the disclosure, the base station may store a corresponding PDU or SDU at a time when a MAC service data unit (SDU) transmitted from a higher layer to a MAC layer, or a PDU (for example, an RLC PDU) generated on the higher layer are transmitted to an HARQ process. Hereinafter, the PDU or SDU may be RLC PDU/MAC SDU, or MAC PDU, that is, TB, according to an embodiment. The base station may map the corresponding PDU or SDU onto HARQ processing ID information based on which the corresponding PDU or SDU is delivered, and may store the mapping information along with data. The mapping information may be retained (preserved) until ACK information on the information transmitting the corresponding PDU or SDU is received, as long as the mapping information does not expire by various timers applied to manage a system or a separate event. An embodiment of such a mapping relationship and the mapping information will be described hereinbelow in greater detail with reference to FIG. 8.

The mapping information is information between the PDU or SDU and the HARQ process ID, and may share a storage space for the PDU or SDU in the system, and may directly map the PDU or SDU and the HARQ process ID. However, the mapping information may be mapping between at least one of logical identification information of the PDU or SDU, such as a logical address for storing the corresponding PDU or SDU information, a sequence number (SN) defined by standards, a separate index number defined according to an embodiment, and the HARQ process ID. For example, the base station may store and manage a mapping relationship between a logical number (for example, an index number) regarding the above-described SDU or PDU, and an HARQ process ID through which the SDU or PDU corresponding to the number is transmitted. That is, the above-described mapping operation is a preliminary step for applying an embodiment of the disclosure, and the base station may perform mapping operations with respect to all target PDUs or SDUs which are transmitted to an HARQ process.

In addition, in an embodiment of the disclosure, in order to utilize transmission of a plurality of TBs for the same HARQ ID more fluidly, the base station may additionally map information related to a corresponding time at the time when corresponding mapping information is generated, that is, at the time when a PDU or SDU is inserted into an HARQ process. The base station may map the time information onto the HARQ ID, and then, may store as mapping information. This may be an internal counter or a system frame number (SFN), a subframe number, a slot number, a symbol index for the disclosure, or a combination thereof. In addition, the internal counter in this case may include a form of an indicator indicating whether the corresponding PDU or SDU is substituted in the HARQ process.

The operation utilizing the mapping information is performed with respect to all target PUDs or SDUs, but the disclosure is not limited thereto. In various embodiments, the base station may additionally perform a process of reading out information of first transmission data at a time when second transmission data is substituted for the first transmission data in the HARQ process, thereby performing a mapping operation with respect to some target PDU or SDU. The base station may additionally perform an operation of extracting an index number from the first transmission data. The base station may perform mapping by extracting only some data, instead of performing a mapping operation with respect to all PDUs or SDUs.

According to an embodiment, the above-described index number may be a sequence number (SN) of an RLC layer. The base station may extract and acquire a corresponding sequence number (SN) from the RLC PDU corresponding to the first transmission data, and may correlate the corresponding SN to the HARQ process ID (for example, HARQ process #0) of the first transmission data. That is, when inserting new data (TB) of the HARQ process, the base station may store a mapping relationship between the SN corresponding to existing data and the corresponding HARQ process. In this case, in one of embodiments of the disclosure, time information may also be mapped. The base station may additionally map information regarding a time of extracting or a time of transmitting onto the mapping relationship information between the data number and the HARQ process, and may store the mapping information. In this case, information regarding the time may be an internal counter or a system frame number (SFN), a subframe number, a slot number, a symbol index, or a combination thereof.

Since the base station stores the mapping relationship between the data information (for example, RLC PDU/MAC SDU or MAC PDU) transmitted in the HARQ process and the HARQ process, information of the pre-transmitted data in the HARQ process may be known even when new data (TB) is transmitted through the HARQ process. Thereafter, feedback of the pre-transmitted data of the HARQ process may be received. The stored mapping relationship may be utilized as a corresponding PDU or SDU is transmitted as first transmission data afterward and ACK/NACK on the transmission data is received. When ACK/NACK information on the corresponding PDU or SDU is received, the HARQ process may deliver the ACK/NACK information to an entity (for example, a base station or DU) which manages the mapping information. In this case, the mapping information management entity which receives the ACK/NACK information may discover a PDU or an SDU which is an entity for receiving ACK/NACK information of a corresponding time, through the HARQ process ID through which ACK/NACK information is transmitted. That is, the entity discovers the PDU or SDU including information of a target which generates ACK/NACK information through the ACK/NACK information and the HARQ process ID through which the ACK/NACK information is delivered. According to an embodiment, when the received ACK/NACK information is ACK, the mapping entity (for example, the base station) may determine that the corresponding PDU or SDU is normally delivered, and may remove the mapping information on the corresponding PDU or SDU. For example, the mapping entity may be implemented by an RLC entity of the base station. In addition, for example, the mapping entity may be implemented by an MAC entity in the base station. In addition, for example, the mapping entity may be implemented in the form of an MAC entity or in the form of an SW block between RLC/MAC layers. When the mapping information is removed, information on the corresponding PDU or SDU which is stored in a buffer may also be removed. On the other hand, when the received ACK/NACK information is NACK, a transmission procedure on the discovered PDU or SDU may newly start. For example, the HARQ process which receives NACK information on first transmission data replaced according to the retransmission procedure of the disclosure may deliver a retransmission indicator to the mapping entity (for example, the base station). The mapping entity (for example, the base station) which receives the NACK information may insert transmission data on the PDU or SDU on which the NACK information is identified, that is, a TB, into the HARQ process, by initiating a transmission procedure from the buffer again.

As shown in FIG. 6, feedback 631 on the first transmission data (a) of HARQ process #0 may be NACK. The base station which receives NACK may identify HARQ process #0. HARQ process #0 may be HARQ process #0 related to the corresponding feedback. The base station may identify HARQ process #0, based on a resource by which feedback information is transmitted, a field of DCI (for example, a HARQ process number) provided at a time when the corresponding resource is assigned. The base station which receives NACK information on the TB (a) which has been transmitted through HARQ process #0 may read out corresponding data from the buffer again, based on mapping information. The base station may generate the read-out data as a new PDU or SDU, based on information acquired from the MAC layer. That is, the base station may identify a PDU or SDU mapping onto HARQ process #0. The base station may regenerate a TB corresponding to the first transmission data (a) of HARQ process #0, based on the identified PDU or SDU. FIG. 6 illustrates that the retransmitted TB is the same as the pre-transmitted TB, but this is merely an example for explaining a retransmission operation principle, and is not interpreted as limiting embodiments. According to an embodiment, the inserted PDU or SDU may not completely be the same as the previous PDU or SDU corresponding to the NACK information. Specifically, the PDU or SDU in this case may be a PDU or SDU that has bits of different lengths due to the PDU or SDU regeneration procedure for retransmission.

When data is retransmitted, the corresponding data may be transmitted through more robust processing in order to increase a transmission probability of data. In an embodiment, the corresponding PDU or SDU may apply wireless transmission configuration for less bit or more robust retransmission according to a state of a radio resource and a link adaptation procedure. In addition, in an embodiment, the corresponding PDU or SDU may be a PDU or SDU that is generated according to a transport block size (TBS) calculated by applying a lower MCS. The corresponding PDU or SDU may apply low physical layer processing. In this case, the corresponding PDU or SDU may be a plurality of PDUs or SDUs which are configured through a PDU or SDU fragmentation technique for retransmission. An embodiment of the disclosure for generating a new PDU or SDU by applying such a fragmentation method and retransmitting will be described through FIG. 7.

Figure 7:
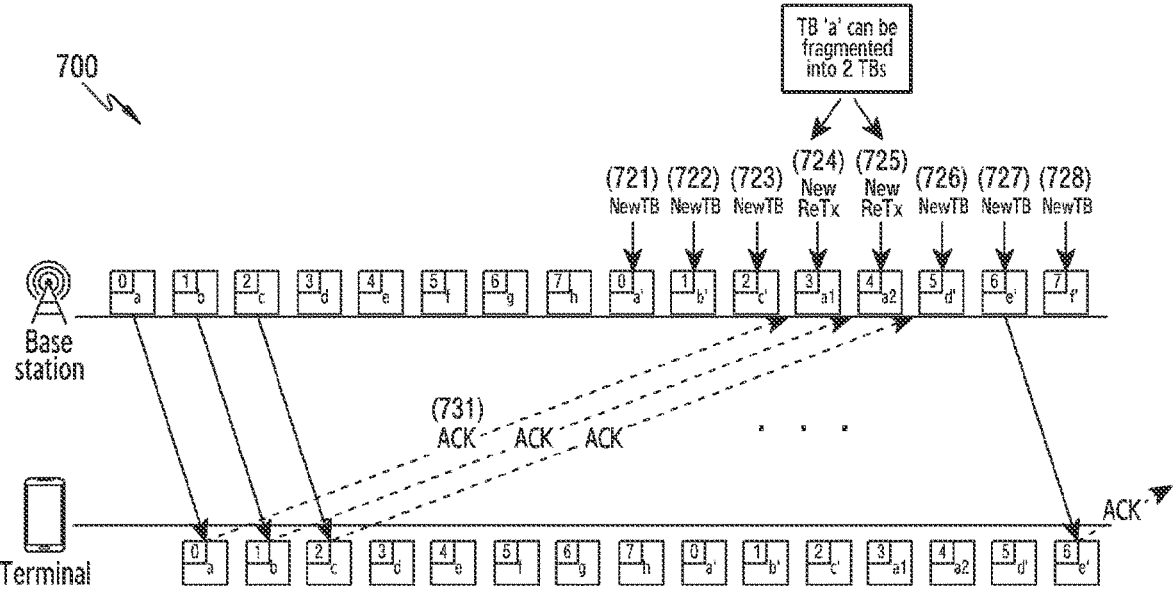
FIG. 7 is a diagram illustrating another example of retransmission of the transmission opportunity-based HARQ procedure according to various embodiments.

FIG. 7 is a diagram illustrating another example of retransmission of the transmission opportunity-based HARQ procedure according to various embodiments. A base station is illustrated by the base station 110 of FIG. 1, and a terminal is illustrated by the terminal 120 of FIG. 1. In a corresponding embodiment, it is assumed that 8 HARQ processes in total are supported, and a situation where HARQ information (ACK/NACK/DTX) on HARQ processes still in use is not received after transmission is continuously performed 8 times using HARQ process #0 to HARQ process #7 is illustrated. As a drawing illustrating a method of avoiding performance degradation caused by a problem of a shortage of HARQ ID occurring in an existing system, FIG. 7 illustrates a procedure of fragmenting a corresponding PDU or SDU and transmitting in a process of performing retransmission (for example, FIG. 6) according to delayed NACK information according to an embodiment.

Referring to FIG. 7, a situation 700 where a corresponding PDU or SDU is retransmitted according to a fragmentation technique is illustrated. The base station may receive NACK information 731 of HARQ process #0. The base station may identify a PDU or SDU corresponding to the corresponding HARQ process from a buffer, based on the NACK information. The base station may perform retransmission by fragmenting the corresponding PDU or SDU into two or more PDUs or SDUs (TB 724, TB 725), based on the identified PDU or SDU and information on a MAC layer. Data of HARQ process #0 may be configured with a new first TB 721 (a'). Data of HARQ process #1 may be configured with a new second TB 722 (b'). Data of HARQ process #2 may be configured with a new third TB 723 (c'). Data of HARQ process #3 may be configured based on an existing TB (a). Data of HARQ process #4 may be configured based on the existing TB (a). Data of HARQ process #5 may be configured with a new sixth TB 726 (d'). Data of HARQ process #6 may be configured with a new seventh TB 727 (e'). Data of HARQ process #7 may be configured with a new eighth TB 728 (f').

For example, a mapping target PDU or SDU that is discovered by NACK information 731 and a corresponding HARQ process (HARQ process #0), and transmission time information may be read out again from the buffer for performing a retransmission procedure. One or more PDUs or SDUs acquired from the buffer may be newly managed by the buffer as a retransmission SDU or PDU. The transmission procedure may be performed with respect to the fragmented PDU or SDU according to a defined sequence of the fragmented PDU or SDU, and a new transmission procedure may be started using each of the fragmented PDU or SDU as one PDU or SDU. In this case, the segmented PDU or SDU may be configured in the form of a newly generated PDU or SDU in combination with other data in the buffer. In other words, each of the fragmented PDU or SDU may include a part of information of the previous PDU or SDU. In addition, the segmented PDU or SDU may be newly configured to include additional information in addition to information included in the PDU or SDU which is an existing target for segmenting. An HARQ process or HARQ ID which is selected when the retransmission PDU or SDU is inserted may be an HARQ process (or HARQ ID) selected by a certain procedure or a HARQ process management and selection procedure, irrespective of the previous mapping relationship. In this case, a configuration for transmission may follow the same method as used for the first transmission (for example, transmission of the first transmission data (a) of HARQ process #0) in the ARQ procedure or the HARQ non-application transmission procedure in the system supporting HARQ as described above.

According to an embodiment, a low MCS may be applied for more robust transmission during retransmission. In this case, the expression "lower MCS" refers to a means for reducing a transmission error of corresponding transmission through a relatively low rate, and may be substituted with elements of the same or similar concept such as Rate, modulation order product code rate (MPR), etc. in addition to the MCS. The expression may be substituted with one or more elements which may cause a change in the same or similar elements as or to the above-described MCS due to system implementation characteristics, or a combination of the elements. In various embodiments of the disclosure, it is illustrated that application of a low MCS for retransmission and a segmentation procedure accompanied thereby are provided a single time in a retransmission procedure, but operations of performing additional segmentations by additionally applying a lower MCS to third, or fourth retransmission caused by failure in retransmission may be understood as an embodiment of the disclosure.

The segmentation method in the disclosure may be illustrated by a PDU configuration on an RLC layer and a segmentation method when the method is described through a specific example of a 3GPP system. Accordingly, the method may be expressed as a method for segmenting into an RLC layer and delivering a retransmission indicator, a method of processing a segmentation procedure according to an RLC segmentation indicator on a MAC layer. An embodiment of the disclosure may include a procedure of informing retransmission through an indicator irrespective of a specific layer, and configuring a PDU or SDU accordingly.

The retransmission procedure of the transmission opportunity-based HARQ technique according to various embodiments of the disclosure described above may put restrictions on the number of retransmissions, which may be the same as or different from restrictions on retransmission by use of existing HARQ. In particular, when segmented transmission is applied, a retransmission counter may be segmented and managed according to segmentation of a retransmission PDU or SDU. For example, one PDU or SDU may be segmented into two PDUs or SDUs, and the two PDUs or SDUs may increase two retransmission counters at a time, and the counters may be segmented and managed such that the counters do not have 3 retransmission counter values and individual counters are set to 2, respectively. Such a counter is different from the counter in the HARQ process, and an entity managing the above-described buffer and a mapping relationship therewith may manage information of the corresponding counter.

Figure 8:
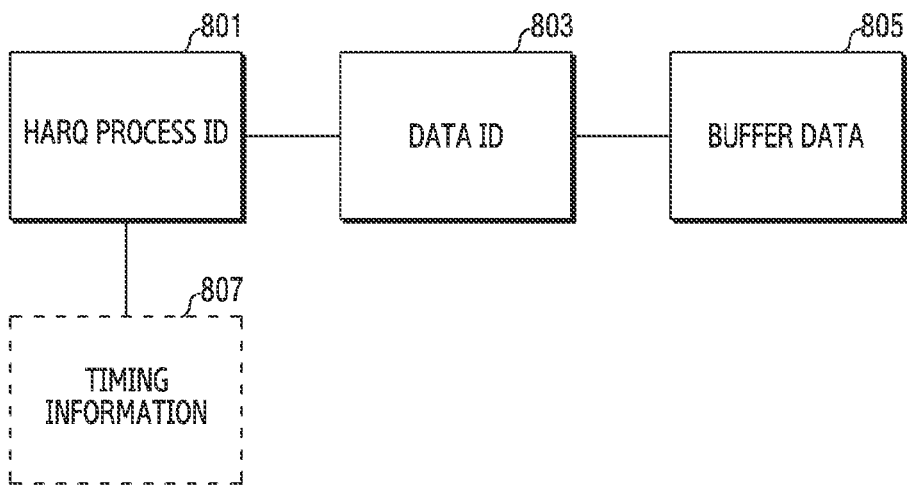
FIG. 8 is a block diagram illustrating an example configuration of mapping information between an HARQ process and transmission data according to various embodiments.

FIG. 8 is a block diagram illustrating an example configuration of mapping information 800 between a HARQ process and transmission data according to various embodiments. An entity of the mapping information is an entity managing a MAC layer, and may include a MAC entity of a base station. After receiving NACK information through corresponding information, the base station may discover retransmission target data according to an embodiment of the disclosure.

Referring to FIG. 8, the mapping information 800 may include a HARQ process ID 801. The HARQ process ID 801 is an identifier indicating a number of a corresponding HARQ process. The HARQ process ID may be used to identify a data ID, data, information of timing related to a specific HARQ process. The mapping information may include parameters related to each HARQ process ID.

The mapping information 800 may include a data ID 803. The data ID 803 may be an identifier indicating transmission data. According to an embodiment, the data ID may be an identifier indicating an RLC PDU (or a MAC SDU). In this case, the data ID may be an SN of the RLC PDU. In addition, according to an embodiment, the data ID 803 may be an identifier indicating a TB as a MAC PDU.

The mapping information 800 may include buffer data 805. The buffer data 805 may include a PDU or SDU corresponding to a corresponding data ID. When NACK information is received, the buffer data 805 may be used for retransmission. The base station may identify a HARQ process ID corresponding to received feedback information, and may identify buffer data corresponding to the identified HARQ process ID. The base station may perform retransmission based on the identified buffer data.

In various embodiments, the mapping information may further include timing information 807. Herein, the timing information is information regarding a time when a PDU or SDU is delivered through a corresponding HARQ process ID, and may include a time when the PDU or SDU is mapped onto the corresponding HARQ process ID (for example, a time of initial transmission, retransmission, or segmented transmission). In addition, the timing information may include a time when the PDU or SDU is extracted from existing data of the HARQ process. The timing information may be a system frame number (SFN), a subframe number, a slot number, or a symbol index, or a combination thereof. The base station may know when new data is transmitted through the HARQ process corresponding to feedback, through the time information. The base station may identify a relationship between HARQ processes, based on the time information, and, based on this, may configure transmission data of each HARQ process. When TBs are transmitted in parallel through a plurality of HARQ processes, the base station may configure a TB of each HARQ process based on the time information. This is because, according to how long a delay is, the base station may identify the number of TBs operable in parallel, that is, the number of scarce HARQ processes.

FIG. 8 illustrates data in an RLC PDU/MAC SDU or MAC PDU unit, but various embodiments of the disclosure are not limited thereto. In various embodiments, a code block (CB) or a code block group (CBG) may be considered as a transmission unit, and the mapping information may include a mapping relationship defined in the unit of CB or CBG. The base station may configure a TB from a mapping relationship, based on feedback of a bit unit per CBG of the terminal. For example, the base station may receive feedback in the CBG unit on HARQ process #2. Thereafter, when HARQ process #5 in which a transmission opportunity comes arrives, the base station may configure a TB based on data corresponding to the CBG which is NACK, and new data. The base station may transmit data which is recognized as a new TB at the terminal. In this case, the base station may instruct the terminal to empty a soft buffer of an HARQ process indicated by DCI, through a CBGFI field of the DCI.

Figure 9:
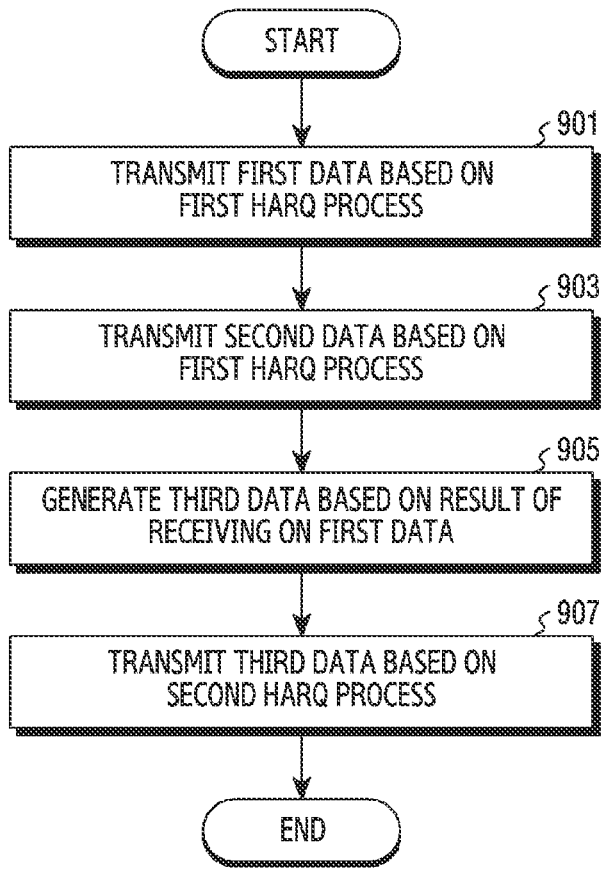
FIG. 9 is a flowchart illustrating an example operation of a base station for an HARQ procedure according to various embodiments.

FIG. 9 is a flowchart illustrating an example operation of a base station for a HARQ procedure according to various embodiments. The base station is illustrated by the base station 110 of FIG. 1. Compared to an existing HARQ process technique based on feedback, the transmission opportunity-based HARQ process technique operates respective HARQ processes irrespective of feedback.

Referring to FIG. 9, at 901, the base station may transmit first data based on a first HARQ process. The first HARQ process may apply the transmission opportunity-based HARQ process technique. Herein, the first data may include data (for example, referred to as application data, service data, data payload, service packet, information bit, data bit, etc.) that the base station intends to service to a terminal. Hereinafter, the data refers to all data that the terminal intends to transmit to the terminal, and is illustrated by a TB which is managed by a HARQ process, but is not interpreted as being limited to a PDU/SDU of a specific layer. According to an embodiment, the data may be used as a signal including control information of a physical layer. The first data may also be transmitted with physical layer control information on the corresponding data. For example, the first data including a TB and relevant HARQ information may be transmitted all together. The HARQ information may include a number of the first HARQ process, an NDI on the TB of the first data, an RV on the TB of the first data, and a TBS on the TB of the first data.

At 903, the base station may transmit second data based on the first HARQ process. The base station may transmit the second data when a transmission opportunity on the first HARQ process comes. The base station may transmit the second data irrespective of feedback on the first HARQ process. The base station may generate the second data irrespective of whether the feedback on the first HARQ process is ACK or NACK. The base station may transmit the generated second data to the terminal. The base station may insert new data and perform a downlink transmission procedure without waiting for feedback even when the feedback on the corresponding HARQ process is not received, which is different from an existing HARQ process technique.

It is assumed that the total number of HARQ processes operating in the base station and the terminal is N. The base station may transmit data to the terminal in parallel through the N number of HARQ processes. The base station may transmit data regarding each of the N number of HARQ processes, and may determine data to transmit through the first HARQ process again. According to various embodiments, when a time to transmit data through the first HARQ process comes, in other words, after data is transmitted through the last HARQ process (for example, HARQ process #N−1), the base station may detect whether feedback on the first HARQ process is currently received. When feedback on the first HARQ process is not received, the base station may determine transmission data for the first HARQ process irrespective of feedback. This is because, when feedback on the first HARQ process is awaited, there is a transmission delay from the last HARQ process until a feedback time. The transmission data may be second data.

The second data may be configured in various ways. According to an embodiment, the second data may be really new data that is newly transmitted, that is, data that is new from the viewpoint of both the base station and the terminal. In addition, according to an embodiment, the second data may be new data from the viewpoint of the terminal (since an NDI is togged or an RV is initialized), but may be pre-transmitted data from the viewpoint of the base station. That is, transmission of the second data may be retransmission of data which has been previously transmitted before the first data of the first HARQ process.

The base station may use mapping information when inserting the second data into the first HARQ process. The base station may correlate an ID of the first HARQ process to a MAC SDU (or RLC SDU) or a MAC PDU corresponding to the pre-transmitted first data. The base station may store the mapping information defining a relationship on the correlation described above. When the feedback on the first HARQ process is NACK, the base station may correlate buffer data for retransmission of the first data with the ID of the first HARQ process, and may store the same. In addition, the base station may correlate information regarding a time when the new second data is included in the first HARQ process with the ID of the first HARQ process, and may additionally store the same.

At 905, the base station may generate third data based on a result of receiving on the first data. The base station may acquire a result of receiving on the first data. The result of receiving on the first data may be acquired after step 903. The base station may identify the first HARQ process from the result of receiving on the first data. The base station may identify buffer data related to the first data corresponding to the first HARQ process, or an ID (for example, an SN of an RLD header) of the first data, based on the mapping information. When the result of receiving on the first data is ACK, the base station may clear (or flush) the buffer data related to the first data. The base station may generate third data which is new from the viewpoint of both the base station and the terminal. When the result of receiving on the first data is NACK, the base station may generate the third data based on the buffer data related to the first data. The third data may be retransmission data from the viewpoint of the base station, but may be new data transmitted through a separate HARQ process from the viewpoint of the terminal.

At 907, the base station may transmit the third data based on the second HARQ process. In this case, the second HARQ process may be independent from the first HARQ process. A HARQ process in which transmission data is determined based on the feedback of the first HARQ process may be configured to be different from the first HARQ process. The second HARQ process may apply a normal HARQ process technique or a transmission opportunity-based HARQ process technique. According to an embodiment, the third data may be transmitted along with HARQ information. The HARQ information may include a number of the second HARQ process, an NDI on a TB of the third data, an RV on the TB of the third data, a TB size of the third data, that is, a TBS. In this case, the NDI corresponds to new data from the viewpoint of the terminal and on the HARQ process, and accordingly, may be toggled compared to an NDI of previous data of the second HARQ process.

In FIG. 9, it is illustrated that the base station considers whether feedback of the first HARQ process is received when determining transmission data for the first HARQ process, but embodiments of the disclosure are not limited thereto. According to an embodiment, the base station may not perform the existing HARQ process technique irrespective of whether real feedback is received, that is, irrespective of whether a real delay occurs. In other words, when a time to transmit through the first HARQ process comes, new data may be inserted into the first HARQ process in all cases. Addressing the retransmission problem only with ARQ without retransmission at the HARQ entity in the MAC layer may also be understood as an embodiment of the disclosure.

FIG. 9 illustrates an example in which feedback on the first data of the first HARQ process is received after the second data is transmitted, but embodiments of the disclosure are not limited thereto. If feedback on the first HARQ process is already received when the time to transmit data through the first HARQ process comes, the base station may determine transmission data for the first HARQ process, based on the feedback, according to the existing HARQ process technique. A procedure of determining whether a feedback delay occurs, that is, whether feedback on the first data of the first HARQ process is received after transmission data of the final HARQ process is terminated, may also be understood as an embodiment of the disclosure. Based on whether a delay really occurs in a corresponding HARQ process, data to be transmitted through the corresponding HARQ process may be determined. If a delay does not occur, data to be transmitted through the corresponding HARQ process may be configured as new data only when the feedback is ACK, and may be configured with existing data for retransmission when the feedback is NACK.

The transmission opportunity-based HARQ process technique has been described with reference to FIGS. 5 to 9. When a transmission opportunity of a HARQ process comes, the base station may not determine data to be inserted based on the feedback information, but may insert new data into the corresponding HARQ process. In this case, the HARQ process to which new data is inserted according to the transmission opportunity may be referred to as an opportunistic HARQ process (O-HARQ process). The base station may operate a plurality of HARQ processes, and may configure at least one O-HARQ process among the plurality of HARQ processes. Embodiments for configuring the O-HARQ process will be described below through FIGS. 10A to 12.

Opportunistic HARQ Process Operating Method

A procedure of utilizing the above-described HARQ combining gain opportunistically may perform transmission without the HARQ combining gain by transmitting by reusing a certain HARQ ID or HARQ process when there is no available HARQ ID (or HARQ process), and in this case, a replaced PDU or SDU may guarantee reliability of transmission according to a retransmission procedure. In the transmission procedure of the disclosure, the HARQ process basically transmits by toggling an NDI. Therefore, the NDI is continuously toggled irrespective of whether the performed transmission succeeds. This may be a bit used as a means for informing that new data is transmitted from the viewpoint of the terminal, but, when control and scheduling information including the NDI toggle information is not transmitted to the terminal, there may be a mismatch in NDI information between the terminal and the base station. The disclosure will be described with reference to a 3GPP system in which control and scheduling information are transmitted through a PDCCH. However, the control and scheduling information may be another element of the same or similar meaning. In addition, the term "PDCCH missing" may be used to indicate a case where the above-described control and scheduling information are not transmitted to a terminal with reference to the 3GPP system in an embodiment of the disclosure, but this term may include the same or similar elements. The NDI mismatch caused by an operation of PDCCH missing will be described through FIGS. 10A and 10B.

Figure 10A:
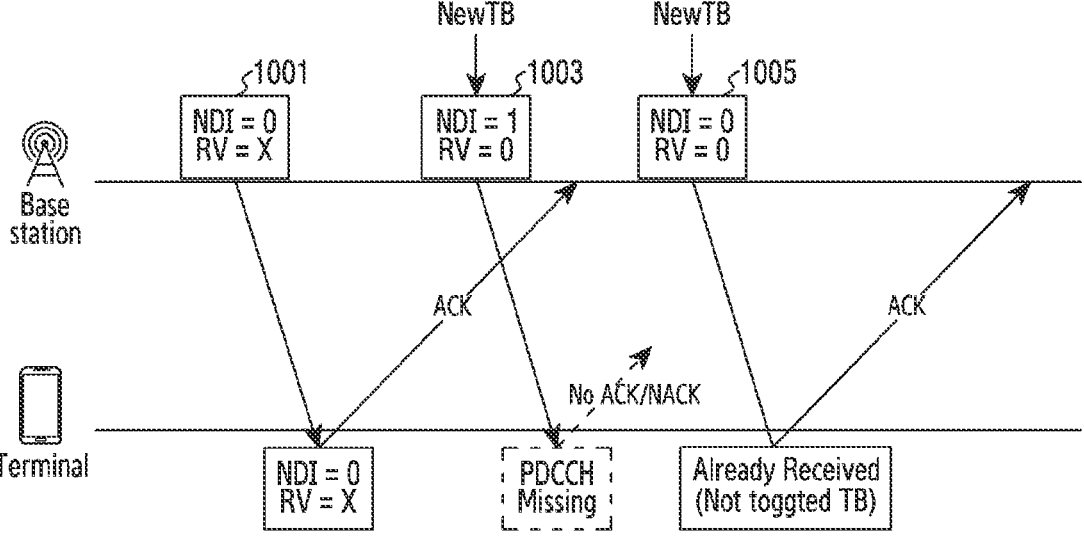
FIGS. 10A and 10B are diagrams illustrating a new data indicator (NDI) mismatch caused by physical downlink control channel (PDCCH) missing according to various embodiments.
Figure 10B:
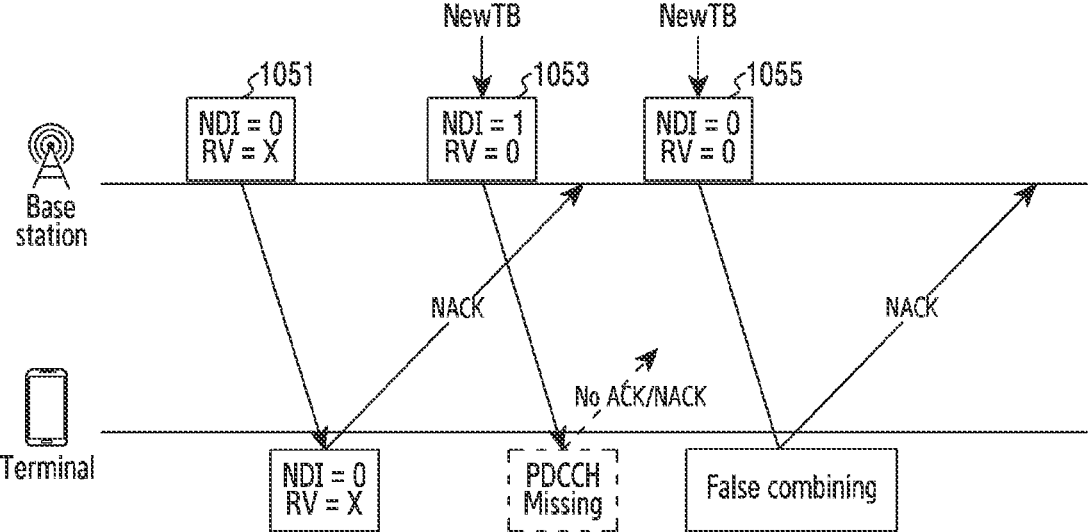

FIGS. 10A and 10B are diagrams illustrating an example of an NDI mismatch caused by PDCCH missing according to various embodiments. FIGS. 10A and 10B illustrate an example of an extreme PDCCH missing situation which may occur when embodiments of the disclosure are applied, and illustrate a procedure regarding an NDI mismatch problem which may occur according to the transmission opportunity-based HARQ procedure (for example, FIGS. 5 to 7) when previous transmission succeeds or fails.

Referring to FIG. 10A, the base station transmits data 1001 to the terminal. In this case, an NDI regarding the data 1001 may be '0', and an RV may be 'X' (for example, X=0, 1, 2, or 3). Thereafter, the terminal may feed ACK back to the base station. The base station may configure first transmission data 1003 as a new TB, regardless of the feedback. An NDI regarding the first transmission data 1003 may be '1', and an RV may be '0'. Since the transmission data is new data, the NDI may be toggled and the RV may be initialized to '0'.

According to the transmission opportunity-based HARQ transmission technique according to various embodiments of the disclosures, by which second transmission data 1005 is transmitted in replace of the first transmission data 1003 which is undergoing a transmission procedure in the HARQ process, the base station may transmit the second transmission data 1005. In this case, an NDI regarding the second transmission data 1005 may be '0', and an RV may be '0'. Since the second transmission data is new data, the NDI may be toggled and the RV may be initialized to '0'.

FIG. 10A illustrates a case where the last transmission data 1001 transmitted before the first transmission data 1003 is transmitted is successfully received by the terminal, and illustrates a situation where a PDCCH of the first transmission data 1003 transmitted by the base station is missed. The terminal may not try to decode the first transmission data 1003, and eventually may not transmit ACK or NACK information. Since the second transmission data 1005 may be configured irrespective of feedback on the first transmission data 1003 in the transmission opportunity-based HARQ technique for addressing a transmission delay, the second transmission data 1005 may be newly configured. The base station expects the terminal to recognize the second transmission data as new data. However, when the PDCCH is missed, the terminal may not know that the NDI is toggled.

For example, a transmission procedure according to the transmission opportunity-based HARQ technique of the disclosure may be applied, and when new transmission (for example, transmission of the second transmission data 1005) occurs on the same HARQ process before ACK/NACK information is delivered to the base station, the base station may toggle the NDI once more and may transmit the same. In this case, transmission having the same NDI value as a PDU or SUD transmitted before PDCCH missing may occur. From the viewpoint of the terminal where PDCCH missing occurs, it may be determined that the same information is received by the previous NDI, and in this case, the terminal may misjudge that new transmission is retransmission of information received before PDCCH missing, that is, retransmission of data 1001. Due to this misjudgement, the terminal may determine that new information from the base station is retransmission of the PDU or SDU which has been previously received, and, based on the situation where the existing information (for example, data 1001) has been successfully received and ACK information has been transmitted as shown in FIG. 10A, the terminal may determine that new reception information is meaningless information and may disregard the same. Since the corresponding information is disregarded, but it is determined that the information is already successfully received information, the terminal may deliver ACK information on the corresponding transmission (for example, the second transmission data 1005).

The base station may receive ACK in response to new information (for example, the second transmission data 1005). Since ACK information is transmitted although the terminal does not normally receive the new information (for example, the second transmission data 1005), the base station may misjudge that the corresponding transmission is successfully performed. As a result, the base station may regard the corresponding transmission as successful transmission although a corresponding PDU or SDU is not well delivered, and may not perform a procedure such as retransmission.

Referring to FIG. 10B, the base station may transmit data 1051 to the terminal. In this case, an NDI regarding the data 1051 may be '0', and an RV may be 'X' (for example, X=0, 1, 2, or 3). Thereafter, the terminal may feed NACK back to the base station. The base station may configure first transmission data 1053 as a new TB, regardless of the feedback. An NDI regarding the first transmission data 1053 may be '1', and an RV may be '0'. Since the first transmission data is new data, the NDI may be toggled and the RV may be initialized to '0'.

According to the transmission opportunity-based HARQ transmission technique according to various embodiments of the disclosures, by which second transmission data 1055 is transmitted in replace of the first transmission data 1053 which is undergoing a transmission procedure in the HARQ process, the base station may transmit the second transmission data 1055. In this case, an NDI regarding the second transmission data 1055 may be '0', and an RV may be '0'. Since the second transmission data is new data, the NDI may be toggled and the RV may be initialized to '0'.

FIG. 10B illustrates a case where the last transmission data 1051 transmitted before the first transmission data 1053 is transmitted is not successfully received by the terminal, and illustrates a situation where a PDCCH of the first transmission data 1053 transmitted by the base station is missed. The terminal may not try to decode the first transmission data 1053, and eventually may not transmit ACK or NACK information. Since the second transmission data 1055 may be configured irrespective of feedback on the first transmission data 1053 in the transmission opportunity-based HARQ technique for addressing a transmission delay, the second transmission data 1055 may be newly configured. The base station expects the terminal to recognize the second transmission data as new data. However, when the PDCCH is missed, the terminal may not know that the NDI is toggled.

In the same or similar way as in FIG. 10A, the terminal may misjudge that new transmission is retransmission of information received before PDCCH missing, that is, retransmission of the data 1051. Due to this misjudgement, the terminal may determine that new information from the base station is retransmission of the PDU or SDU which has been previously received, and, since the terminal has not successfully decoded a corresponding TB, the terminal may decode by combining the previously received information (for example, data 1051) with newly received information (for example, the second data 1055). However, since the data 1051 and the second data 1055 are data which are generated by really different TB s, decoding may fail. The base station may receive NACK on the new information (for example, the second transmission data 1055). Thereafter, when the NDI is toggled, new data may be transmitted although the existing transmission data 1051 is not well delivered repeatedly, and accordingly, the terminal may lose a coupling gain.

The above-described problem may be addressed through a retransmission procedure of a higher layer, but the disclosure describes a solution for preventing/reducing a situation of PDCCH missing preemptively in order to minimize and/or reduce a problem caused by an overhead for retransmission on a higher layer and other transmission delays.

Configuration of Opportunistic HARQ Process

A PDU or SDU missed by PDCCH missing may be a PDU or SDU that performs a transmission procedure (configuring a new TB irrespective of feedback of a corresponding HARQ process) of the disclosure through a corresponding HARQ process after PDCCH missing occurs, and the above-described problems arise before it is possible to determine regarding PDCCH missing. Due to this characteristic, there is no way of addressing the problem caused by PDCCH missing after the problem arises, and a base station and a terminal may be required to operate to prevent and/or reduce the problem preemptively by reducing a probability that PDCCH missing occurs. This may be achieved by applying solutions called "conservatization on PDCCH transmission," but conservatization needs to be applied before the transmission method of the disclosure is applied, not a time when the transmission method is applied, and accordingly, the disclosure considers application of a preemptive PDCCH conservatization solution.

By applying the disclosure, the preemptive PDCCH conservatization solution may operate for stable transmission in case of PDCCH missing of a first transmission frame which is replaced in a HARQ process before ACK/NACK information. Accordingly, the disclosure describes a procedure of classifying some of the plurality of HARQ processes into a HARQ process to which the disclosure is applied (hereinafter, a transmission opportunity-based HARQ process or an opportunistic HARQ process (O-HARQ process)), and classifying the other HARQ processes into a HARQ process following an existing operation to which the transmission method of the disclosure is not applied (hereinafter, a feedback-based HARQ process). It is illustrated that a base station classifies types of HARQ processes, but other entities than the base station may classify types of corresponding HARQ processes.

According to an embodiment of the disclosure, there may be a procedure of configuring whether an individual HARQ process is a target to which the disclosure is applied with respect to HARQ processes in advance. When all HARQ processes or HARQ process IDs are being used, a HARQ process to be selected to transmit new data may be selected from the HARQ processes configured as a target group to which the disclosure is applied. In the disclosure, the HARQ process which is the target for applying may be referred to as an opportunistic HARQ process (O-HARQ process). In addition, a group including one or more opportunistic HARQ processes may be referred to as an O-HARQ process group. According to an embodiment of the disclosure, when the transmission opportunity-based HARQ process technique (e.g., FIGS. 5 to 7) of the disclosure is applied to all HARQ processes, the base station may assign all available HARQ processes to the O-HARQ process group. According to an embodiment, when the transmission opportunity-based HARQ process technique of the disclosure is not applied, a separate indicator for this may be delivered or an effective HARQ process may not be assigned to the O-HARQ process group, such that the transmission opportunity-based HARQ process technique may not be applied. According to various embodiments, the base station may apply the above-described transmission opportunity-based HARQ process technique to the O-HARQ process group which is the target for applying the disclosure to be able to insert new second transmission data to a corresponding HARQ process before ACK/NACK information on the first transmission data is received, and may perform a procedure of conservatizing the corresponding transmission by applying a lower MCS to PDCCH transmission or by assigning more resources with respect to all data transmitted through the corresponding HARQ process.

In various embodiments of the disclosure related to a 3GPP system, the base station may implement the above-described conservatization operation by applying a higher aggregation level to a PDCCH utilized for transmission of an O-HARQ process group than to a PDCCH utilized for transmission of a process which is not a target, or by applying greater transmission power. In addition, with respect to the O-HARQ process group, conservatization may be applied not only for PDCCH transmission but also for resource assignment for first transmission and a transmission rate.

In the disclosure, the term "conservative" or "conservatization" may refer, for example, to a state in which a signal is stably delivered or processing for stable transmission of a signal. Such a conservatization procedure may be applied independently from the transmission procedure applying a lower MCS (or the same or similar concept) in the retransmission procedure described above. That is, the base station may perform transmission with respect to an O-HARQ process of an O-HARQ process group with higher reliability than when transmitting assigned data to a HARQ process that does not belong to the O-HARQ process.

In various embodiments, the base station may perform a separate rate control method and a procedure having a lower target error probability (Target BLER) with respect to processes belonging to the O-HARQ process.

In addition, in various embodiments, the conservatization processing may employ a low modulation scheme or may include signal processing through a low coding rate. For example, the conservatization processing may include data processing according to a low MCS level.

In addition, in various embodiments, the conservatization processing may include signal processing which causes as many repetitions as possible with the same resource by reducing a size of a data payload (for example, a TBS). According to an embodiment, the conservatization processing may include an operation of configuring a TB including only a CBG requiring retransmission in order to reduce the number of bits transmitted. In addition, according to an embodiment, the conservatization processing may include an operation of simply configuring a TB having a lower TBS irrespective of a CBG.

In addition, in various embodiments, the conservatization processing may include an operation of configuring an offset regarding channel quality to have a low error rate. The base station may apply an offset value to an existing MCS to be applied to a process other than the O-HARQ process group, or a Rate, an MPR which is substituted with the MCS, and may apply the MCS rate, the MPR, etc. to which an offset defined for a given MCS, Rate, MPR is applied, to transmission of processes within the O-HARQ process group. In this case, the offset regarding the MPR and the MCS, Rate described above may be a value that is added to or subtracted from a value of a target for applying, and may be a value that is applied in the form of a coefficient which is multiplied with a value of a target, or a multiplier according to an implementation form.

In the operation on the O-HARQ process described above, when the above-described MCS, Rate, MPR or field values that may influence deriving of the MCS, Rate, MPR are less than or equal to a predetermined value, or when an operation indicating a similar environment is detected, a solution for configuring so as not to perform the O-HARQ process operation according to embodiments of the disclosure may also be included in the disclosure. Specifically, when an MCS, Rate, MPR on a target terminal is less than or equal to a predetermined threshold, the base station according to various embodiments of the disclosure may not apply an embodiment of the disclosure where new data is inserted into a HARQ process before data transmission in the HARQ process is completed. According to an embodiment, the operation of inserting new data into the HARQ process may be limited as being performed when transmission is performed as many times as the maximum number of transmissions of the corresponding HARQ process, or after ACK information on a transmission TB is received. The procedure of comparing the MCS, Rate, MPR with the threshold may be substituted with a procedure of comparing a field value with the terminal measured by the base station and a threshold. That is, when a value corresponding to the field value is less than or equal to the threshold, the base station may perform an operation without using the above-described O-HARQ. In addition, when NACK is continuously received, and accordingly, failures to transmit cumulate, the base station may perform an operation without using the above-described O-HARQ if a number exceeding a threshold thereof cumulates. A procedure of limiting various embodiments of the disclosure described above may utilize a combination of one or more methods, and may not be used according to a system operating method.

A processing solution on the O-HARQ process or O-HARQ process group has been described. In addition to the conservatization on the O-HARQ process group and the transmission-retransmission procedure, the disclosure provides a management solution on the O-HARQ process group. The O-HARQ process group may be defined in various ways. In various embodiments, the number of HARQ processes in the O-HARQ process group may be configured to a pre-defined value. In various embodiments, the number of HARQ processes in the O-HARQ process group may be configured to a separate configuration value. In various embodiments, the number of HARQ processes in the O-HARQ process may be adaptively configured according to an operation of a base station or a terminal.

A size of the O-HARQ process group, that is, the number of O-HARQ processes, may be configured through configuration. Configuring the number of O-HARQ process groups by a pre-defined value or a separate configuration value may be defined in a configuration method of the disclosure, and the number of O-HARQ process groups once defined in this way may be maintained as it is before a new configuration procedure is performed. A method of implementing such a configuration method may include a method of always applying a pre-defined fixed value, a method of utilizing a certain configuration value defined in a base station system and changing the configuration value when necessary, and a method of reflecting a request or preference of a terminal by exchanging information with the terminal.

In various embodiments, when a fixed value is utilized, the O-HARQ process group may include a number of HARQ process(s) defined at a step of designing or implementing a system.

In various embodiments, when a configuration value or a parameter in the base station system is used, the base station may read a configuration value and may apply the obtained configuration value as the size of the O-HARQ process group or the number of HARQ processes assigned to the O-HARQ process group.

In various embodiments, the method of reflecting a request or preference of the terminal by exchanging information with the terminal may determine the number of HARQ processes assigned to the O-HARQ process group based on a message configured according to standards. According to an embodiment, the terminal may transmit a message (for example, a UE capability information message, a UE information response message) indicating the preferred number of O-HARQ processes to the base station. Thereafter, the base station may indicate the number of HARQ processes assigned to the O-HARQ process group, based on the terminal, through the configuration message. The configuration message may include information regarding whether an operation according to an embodiment of the disclosure, that is, the transmission opportunity-based HARQ technique, will be implemented, or the number of HARQ processes to which the embodiment is applied. Configuration related to the O-HARQ process is shared between the base station and the terminal, such that the base station may perform operations according to the transmission opportunity-based HARQ technique with the corresponding configuration (configuration of the O-HARQ process group, the number of O-HARQ processes). In this case, the configuration message may be a radio resource control (RRC) message exchanged between the base station and the terminal.

An indicator indicting the number of HARQ processes to which the above-described embodiment of the disclosure is applied may be an indirect element indicating not only the number of HARQ processes applied as the expression indicates, but also a range applying an embodiment of the disclosure. The indirect element may control the size of the O-HARQ process group or the number of HARQ processes assigned to the O-HARQ process group. In addition, the message configured by standards as described above may include an indicator for determining whether to apply embodiments of the disclosure to downlink transmission to a corresponding terminal directly or indirectly.

A method of managing the O-HARQ process group adaptively may be provided for the purposes of reducing a burden caused by PDCCH conservatization according to application to the O-HARQ process group, and optimizing providing of a HARQ combining gain opportunity on the O-HARQ process group. The method of managing the O-HARQ process group adaptively may include an operating of changing the size of the O-HARQ process group or the number of HARQ processes assigned to the O-HARQ process group adaptatively from a pre-defined or configured minimum value to a maximum value. In this case, the minimum value and the maximum value may be values which are fixed and used at the step of designing or implementing a system in advance, or values which are configured according to a system operation, or values which are configured by exchanging information with the terminal, which is similar to the above-described method of configuring the size of the O-HARQ process group or the number of HARQ process assigned to the O-HARQ process group. In addition, a value obtained by exchanging information with the terminal may be a direct number indicating the explicit number, or may be a message including information in an indirect form corresponding thereto (for example, a parameter which is a base for determining the number of O-HARQ processes).

Hereinafter, an example in which an O-HARQ process group including P number of O-HARQ processes among the N number of HARQ processes in total is configured between a base station and a terminal will be described. The base station may operate Q number of HARQ processes (that is, feedback-based HARQ processes) in addition to the P number of O-HARQ processes (herein, Q equals N-P). According to an embodiment, the O-HARQ process is an HARQ process to which a HARQ technique (transmission opportunity-based HARQ technique) is applied in order to prevent and/or reduce a transmission delay due to a shortage of the number of HARQ processes, and the base station may transmit new data based on a corresponding HARQ process even when feedback on data transmitted in the corresponding HARQ process is not received.

Figure 11:
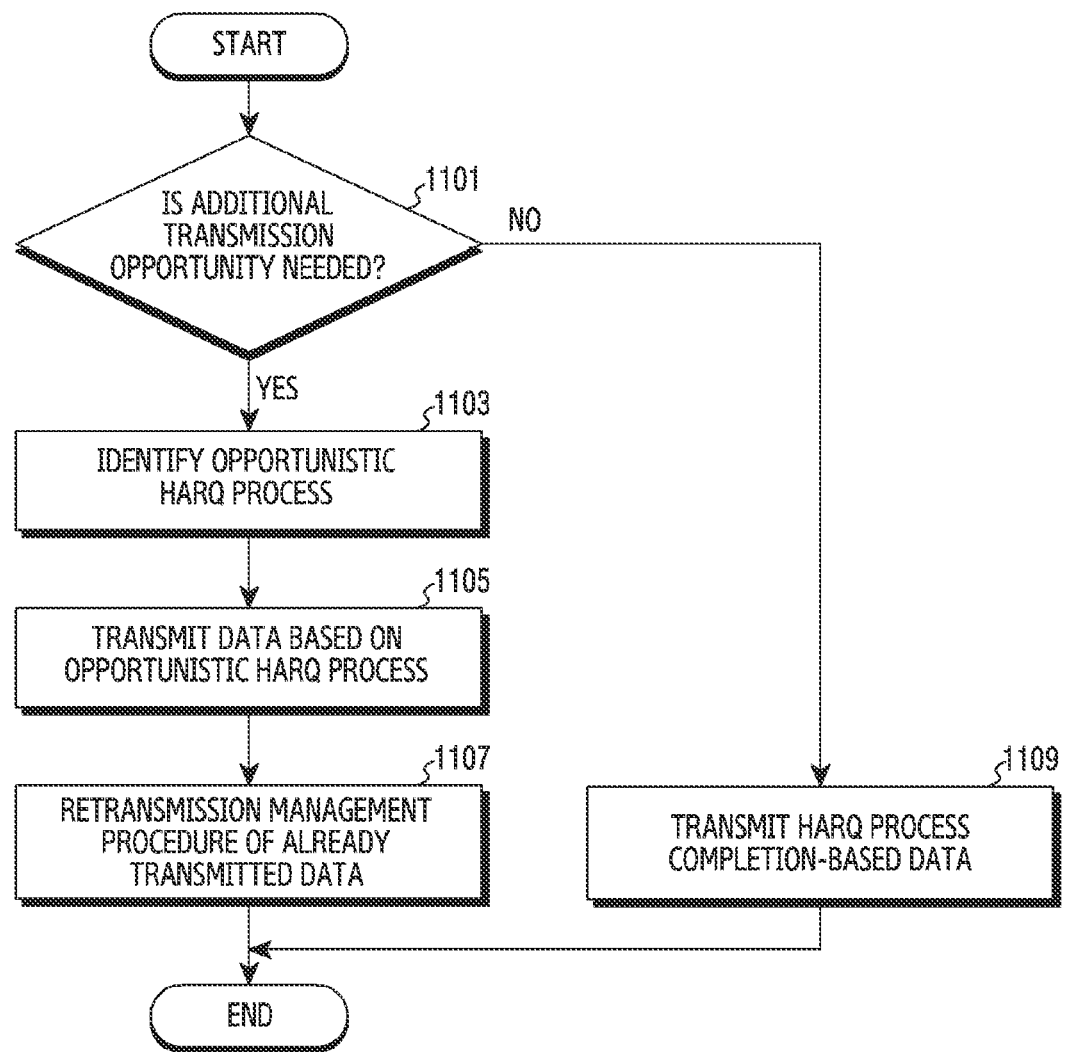
FIG. 11 is a flowchart illustrating an example operation of a base station for performing a transmission procedure for each HARQ process according to various embodiments.

FIG. 11 is a flowchart illustrating example operations of a base station for performing a transmission procedure for each HARQ process according to various embodiments. The base station is illustrated by the base station 110 of FIG. 1.

Referring to FIG. 11, at 1101, the base station may detect whether an additional transmission opportunity is needed. Herein, the additional transmission opportunity refers to an opportunity to perform a procedure (the transmission opportunity-based HARQ procedure of FIGS. 5 and 6) of acquiring a new TB in a corresponding HARQ process and transmitting the same even when feedback information is not received, other than awaiting until feedback information is received due to restrictions on the number of HARQ processes. According to an embodiment, the base station may determine whether feedback information on all of the HARQ processes is not received. When feedback information on all of the HARQ processes currently configured is not still received, the base station may determine that the additional transmission opportunity is needed. In addition, according to an embodiment, the base station may determine whether there is a shortage of the HARQ processes due to a transmission delay of feedback information, based on a difference of numerology between two or more cells in which CA is configured, or a backhaul delay value between cells in which CA/DC is configured. When the difference of numerology or the backhaul delay value is greater than or equal to a threshold value, the base station may determine that the additional transmission opportunity is needed. In addition, according to an embodiment, when CA is configured with a carrier of FR1 and a carrier of FR2, the base station may predict a transmission delay and may determine that the additional transmission opportunity is needed.

When the additional transmission opportunity is needed, the base station may perform operation 1103. The base station may perform operations according to the transmission opportunity-based HARQ technique. When the additional transmission opportunity is not needed, the base station may perform 1109. The base station may perform operations according to an existing HARQ technique.

At 1103, the base station may identify an opportunistic HARQ process (O-HARQ process). The base station may not await anymore even when feedback information on each of the HARQ processes which are currently in progress is not received.

At 1105, the base station may perform opportunistic HARQ process-based data transmission. The base station may transmit data based on mapping information. The mapping information may include a relationship between a HARQ process ID and data (PDU or SDU) already transmitted in the corresponding HARQ process. The base station may store a relationship between the identified O-HARQ process and the already transmitted data, and may insert new data on the O-HARQ process. The relationship between the data and the O-HARQ process may be already inserted at a time when the corresponding data is inserted into the corresponding O-HARQ process from a higher layer. The base station may transmit new data based on the O-HARQ process. Herein, the new data is new data from the viewpoint of the terminal, and the base station may toggle an NDI and may transmit the data. On the other hand, the new data may be new data from the viewpoint of the base station or not. When ACK on data of another HARQ process is received, the new data may be newly configured based on a data payload that the base station really intends to transmit. When NACK on the data of another HARQ process is received, the new data may be configured to retransmit the corresponding data.

At 1107, the base station may perform a retransmission management procedure of the already transmitted data. Since the data transmitted according to the opportunistic HARQ process-based data transmission at S1105 is not managed according to completion of the HARQ process, the base station may additionally perform a separate retransmission management procedure. The base station may update mapping information.

At 1109, the base station may perform HARQ process completion-based data transmission. The HARQ process completion-based data transmission refers to data transmission that is performed according to feedback information (indicating at least one of ACK, NACK, or DTX) regarding data already transmitted in the corresponding HARQ process ID. The base station may transmit data that is configured through the information (for example, ACK feedback, NACK feedback or information indicating that the number of retransmissions exceeds a maximum value) obtained when the additional transmission opportunity is determined at step 1101. For example, when feedback information indicates ACK, the base station may transmit newly configured data. An NDI may be toggled and an RV may be initialized. For example, when feedback information indicates NACK/DTX, the base station may transmit data configured for retransmission. An NDI may be toggled and an RV may be changed (for example, RV2).

FIG. 11 illustrates that the procedure of determining whether the additional transmission opportunity is needed at step 1001 precedes step 1003, but embodiments of the disclosure are not limited thereto. The base station may not perform step 1001 and may perform steps 1103 to 1107 or may perform step 1109 according to a pre-configured HARQ process sequence.

According to various embodiments, an entity (hereinafter, a base station) managing the O-HARQ process group may refer to a PDCCH assignment failure rate, in-time ACK/NACK information on HARQ processes within the O-HARQ process group in order to adaptively change the size of the O-HARQ process group or the number of HARQ processes assigned to the O-HARQ process group. In this case, the PDCCH assignment failure rate is a value that increases when the base station is not able to schedule for the terminal due to a shortage of PDCCH resources. In this case, the in-time ACK/NACK information on the HARQ processes in the O-HARQ process group is information indicating the number of times or a ratio that the HARQ processes in the O-HARQ process group does not follow the transmission procedure according to an embodiment of the disclosure, and second transmission data is inserted into the HARQ process after ACK/NACK information on transmitted first transmission data is received. The PDCCH assignment failure ratio may be information that is utilized for the purpose of identifying whether the embodiment of the disclosure regarding the PDCCH conservatization results in a shortage of radio control resources, and the in-time ACK/NACK information on the HARQ processes in the O-HARQ process group is recording information regarding how much the transmission and retransmission procedure of the disclosure is needed. Hereinafter, an operation flow of a base station for adaptively configuring O-HARQ processes based on the above-described information will be described through FIGS. 12A and 12B.

Figure 12A:
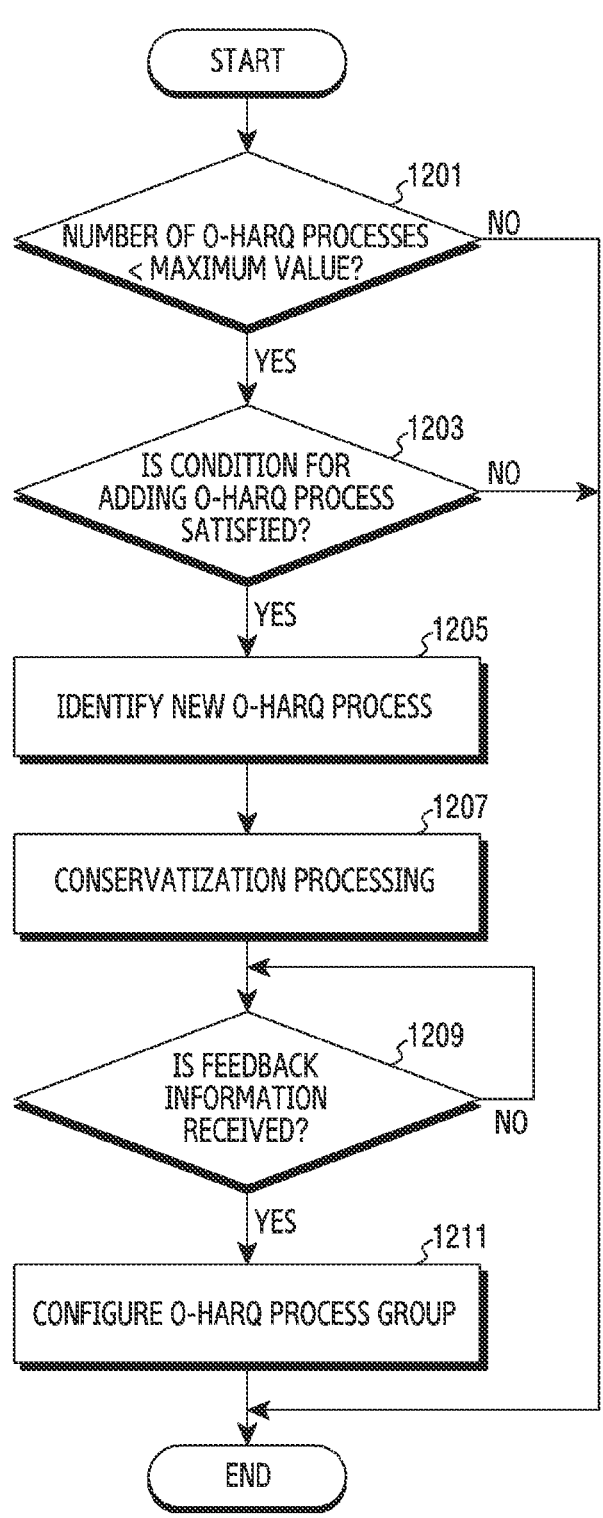
FIGS. 12A and 12B are flowcharts illustrating example operations of a base station for configuring an adaptive opportunistic HARQ process group according to various embodiments.

FIG. 12A is a flowchart illustrating an example operation of a base station for adaptively configuring an O-HARQ process group according to various embodiments. The base station is illustrated by the base station 110 of FIG. 1. The base station is an example of an entity for managing the O-HARQ process group, and, when the entity for managing the O-HARQ process group is configured as a node separate from the base station, the corresponding entity may perform operations which will be described below. In FIG. 12A, a procedure of adding an O-HARQ process will be described.

Referring to FIG. 12A, at 1201, the base station may determine whether the number of O-HARQ processes is less than a maximum value. When the number of O-HARQ processes is less than the maximum value, the base station may perform the procedure of adding the O-HARQ process. The base station may perform 1203. When the number of O-HARQ processes is not less than the maximum value, the base station may finish the procedure of FIG. 12A.

At 1203, the base station may determine whether a condition for adding the O-HARQ process is satisfied. When it is determined that a PDCCH assignment failure rate is maintained as being less than or equal to a pre-set specific value, or a value corresponding to the number of times or a ratio of in-time ACK/NACK for the HARQ processes in the O-HARQ process group is maintained as being less than or equal to a predetermined value, the base station which adaptively manages the O-HARQ process group may increase the size of the O-HARQ process group or the number of HARQ processes assigned to the O-HARQ process group. When both the above-described two conditions are satisfied simultaneously, or only one of the two conditions is satisfied, the corresponding operation may be performed. Alternatively, only one condition may be checked from the first time, and the number of HARQ processes assigned to the O-HARQ process group may be increased. A low PDCCH failure rate may refer, for example, to the probability that the situation shown in FIGS. 10A and 10B occurring is low, and an arrival rate of ACK/NACK within a defined time may be low since the probability of transmission delay caused by a shortage of the number of HARQ processes is high. When the above-described condition is satisfied, the base station may perform step 1205. When the above-described condition is not satisfied, the base station may finish the procedure of FIG. 12A.

At 1205, the base station may identify an O-HARQ process. The base station may identify an O-HARQ process to apply the transmission opportunity-based HARQ process technique among the existing HARQ processes (Q number of HARQ processes). When the size of the O-HARQ process group or the number of HARQ processes assigned to the O-HARQ process group is smaller than a defined or configured maximum value, the base station may select a HARQ process to add first.

At 1207, the base station may perform conservatization processing with respect to the selected HARQ process. The conservatization processing refers to signal processing that is performed to allow a PDCCH to be stably transmitted on a channel. The selected HARQ process applies a PDCCH conservatization procedure to the HARQ process first. For example, the base station may assign high power to the selected HARQ process, and may transmit control information of the PDCCH and data of the PSDCH. In addition, for example, the base station may perform conservatization processing with respect to the selected HARQ process to have a low transmission rate.

At 1209, the base station may determine whether feedback information on data of the selected HARQ process is received. The feedback information may indicate ACK or NACK on data of the HARQ process. The base station may perform step 1211 when feedback information is received.

At 1211, the base station may include the HARQ process identified at step 1205 to the O-HARQ process group. The base station may formally configure the corresponding HARQ process to belong to the O-HARQ process group at a time when ACK/NACK information of the corresponding HARQ process is received. Thereafter, when an O-HARQ process is needed (for example, step 1101 of FIG. 11), the base station may perform a transmission procedure according to the O-HARQ process according to the above-described embodiment of the disclosure.

Steps 1207 to 1209 of FIG. 12A are operations for configuring a stable HARQ process in order to address problems caused by PDCCH missing of FIGS. 10A and 10B preemptively, but in various embodiments, the corresponding operations may not be performed. For example, a procedure of adding an O-HARQ process without conservatization processing based on whether the condition of step 1203 is satisfied may be included in an embodiment of the disclosure.

Figure 12B:
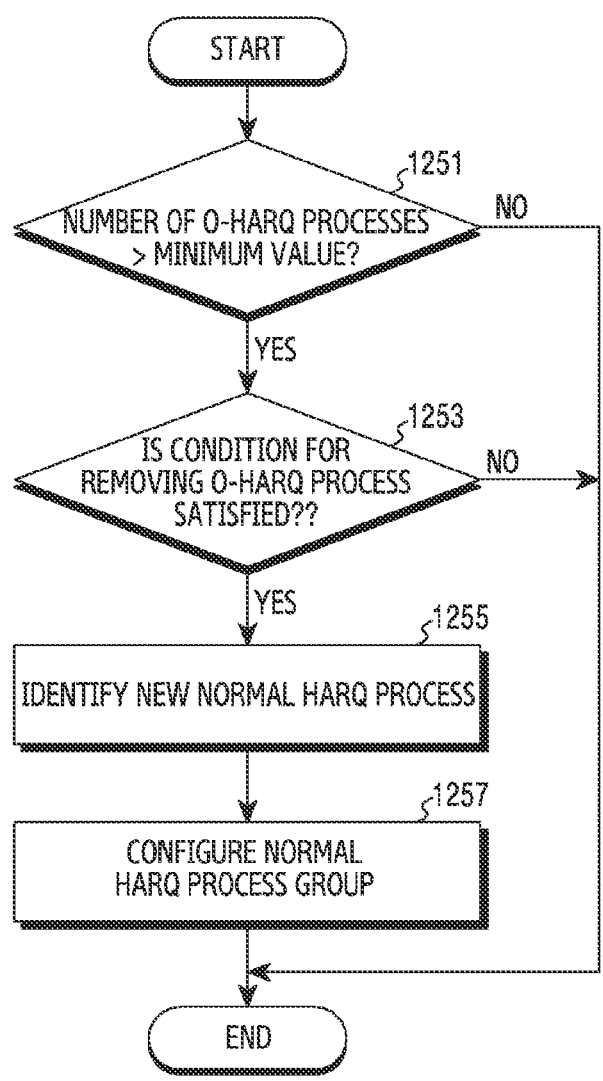

FIG. 12B is a flowchart illustrating an example operation of a base station for adaptively configuring an O-HARQ process group according to various embodiments. The base station is illustrated by the base station 110 of FIG. 1. The base station is an example of an entity for managing an O-HARQ process group, and, when the entity managing the O-HARQ process group is configured as a node separate from the base station, the corresponding entity may perform operations which will be described below. FIG. 12B illustrates a procedure for removing an O-HARQ process.

Referring to FIG. 12B, at 1251, the base station may determine whether the number of O-HARQ processes is greater than a minimum value. When the number of O-HARQ processes is greater than the minimum value, the base station may perform a procedure for removing an O-HARQ process. The base station may perform operation 1253. When the number of O-HARQ processes is not greater than the minimum value, the base station may finish the procedure of FIG. 12B.

At 1253, the base station may determine whether a condition for removing the O-HARQ process is satisfied. When it is determined that a PDCCH assignment failure rate is maintained as being greater than or equal to a pre-set specific value, or a value corresponding to the number of times or a ratio of in-time ACK/NACK for the HARQ processes in the O-HARQ process group is maintained as being greater than or equal to a predetermined value, the base station which adaptively manages the O-HARQ process group may reduce the size of the O-HARQ process group or the number of HARQ processes assigned to the O-HARQ process group. When both the above-described two conditions are satisfied simultaneously, or only one of the two conditions is satisfied, the corresponding operation may be performed. Alternatively, only one condition may be checked from the first time, and the number of HARQ processes assigned to the O-HARQ process group may be reduced. When the above-described condition is satisfied, the base station may perform step 1255. When the above-described condition is not satisfied, the base station may finish the procedure of FIG. 12B.

At 1255, the base station may identify an O-HARQ process. The base station may identify a normal HARQ process to apply a normal HARQ process technique among the O-HARQ processes (P number of HARQ processes).

When the size of the O-HARQ process group or the number of HARQ processes assigned to the O-HARQ process group is greater than a defined or configured minimum value, the base station may select a HARQ process to remove from the O-HARQ process group, and may configure the corresponding HARQ process to operate according to an existing HARQ operation procedure at 1257. The existing HARQ operation may refer an operation of awaiting without inserting new data until feedback information is received in a corresponding HARQ process, and an operation of generating new data (when feedback information is ACK) or retransmission data (when feedback information is NACK) based on feedback information when feedback information is received, and delivering the same.

In the process of identifying one or more conditions (for example, step 1203, step 1253) in FIGS. 12A and 12B, the expression "being maintained as" may imply that a specific state is maintained continuously or within a defined range, and may imply that a time during which the state is maintained or a value resulting therefrom is greater than or equal to a threshold value or exceeds the threshold value.

Embodiments of the disclosure regarding the processes of FIGS. 12A and 12B described above may be applied all together. For example, some operations of the sequence diagram of FIG. 12A may be performed in combination with some operations of the sequence diagram of FIG. 12B. According to an embodiment, when the condition at step 1201 or step 1203 of FIG. 12A is not satisfied, the base station may be configured to perform step 1251 of FIG. 12B. In addition, according to an embodiment, when the condition at step 1251 or step 1253 of FIG. 12B is not satisfied, the base station may be configured to perform step 1201 of FIG. 12A.

The condition for adding or removing an O-HARQ process is determined based on the PDCCH assignment failure rate and the in-time ACK/NACK rate. When the number of target processes of the O-HARQ process group (# of O-HARQ processes) is smaller than a given maximum value (MAX_O-HARQ) of the O-HARQ process, the base station may determine whether the PDCCH assignment failure rate is smaller than a threshold value and whether the in-time ACK/NACK rate is smaller than a threshold value therefor. This may refer, for example, to there being adequate PDCCH resources, but the ratio of processes in the O-HARQ process group utilized for an existing HARQ operation is low due to a delay. In this case, the above-described operation procedure may be performed to increase the number of O-HARQ processes. In addition, when a current environment does not satisfy the condition for increasing the number of O-HARQ processes, the base station may identify whether the condition for removing the O-HARQ process (that is, a condition for reducing) is satisfied. This operation may be performed only when the number of target processes of the O-HARQ process group (# of O-HARQ processes) is larger than a given minimum value of the O-HARQ process (MIN_O-HARQ), and the operation procedure of reducing the number of O-HARQ processes may be performed only when the PDCCH assignment failure rate or the in-time ACK/NACK rate information is larger than a threshold value.

Through FIGS. 12A and 12B, the O-HARQ process group may be adaptively configured. The base station may adaptively operate O-HARQ processes according to a configuration. In various embodiments, the base station and the terminal may reconfigure O-HARQ processes through a separate configuration message (for example, an RRC message). The base station may aperiodically or periodically configure and manage the O-HARQ processes according to occurrence of an event. In various embodiments, the base station may manage the O-HARQ processes through additional control signaling, in addition to the configuration message. The O-HARQ process may be individually configured in an activation/inactivation form through control signaling such as MAC CE or DCI. For example, when a HARQ process ID in a MAC CE is indicated and transmitted, the corresponding HARQ process may be activated as an O-HARQ process. The activated O-HARQ process may apply the transmission opportunity-based HARQ procedure (FIGS. 5 to 7). In addition, for example, when the HARQ process ID in the MAC CE is indicated and transmitted, the corresponding HARQ process may be inactivated as an O-HARQ process. The inactivated HARQ process may apply a normal HARQ procedure (FIGS. 4A to 4C).

According to various embodiments of the disclosure, the HARQ method which is utilized as a retransmission procedure in a wireless communication system may be adaptively operated to obtain a bit combination according to the HARQ method or to follow a separate retransmission procedure by abandoning a corresponding gain, according to a given situation. The separate retransmission procedure refers to a procedure that performs new transmission or retransmission by utilizing a HARQ process ID and mapping information included in the base station independently. The retransmission procedure has been described through FIGS. 6 and 7.

According to various embodiments of the disclosure, the base station may not acquire a HARQ gain (gain obtained by a bit combination) of the terminal by utilizing HARQ fluidly in a CA environment, and in this case, different retransmission methods for performing a retransmission procedure adaptively according to a wireless environment between the base station and the terminal may be utilized and retransmission may be adaptively performed. The retransmission procedure has been described through FIGS. 6 and 7.

For example, according to various embodiments of the disclosure, the base station may segment information bits for retransmission, and may distribute to different PDUs and deliver the information bits.

According to various embodiments of the disclosure, through a management technique of a HARQ process, the base station may fixedly or adaptively divide and manage HARQ processes which perform transmission by mixing a transmission procedure by only performing an HARQ operation (feedback-based HARQ procedure), and a separate retransmission procedure (transmission opportunity-based HARQ procedure).

Through FIGS. 4A to 12B, operations of transmitting new data on the HARQ process or retransmitting existing data have been described. In this case, a TB has been described as a unit of transmitted data by way of an example. However, various embodiments of the disclosure may include transmission and retransmission in the unit of a code block (CB) or a code block group (CBG). According to an embodiment, when the transmission opportunity-based HARQ procedure is applied to a terminal in which CBG retransmission is configured, the base station may instruct a soft buffer to empty through a CBG flush indicator.

Figure 13:
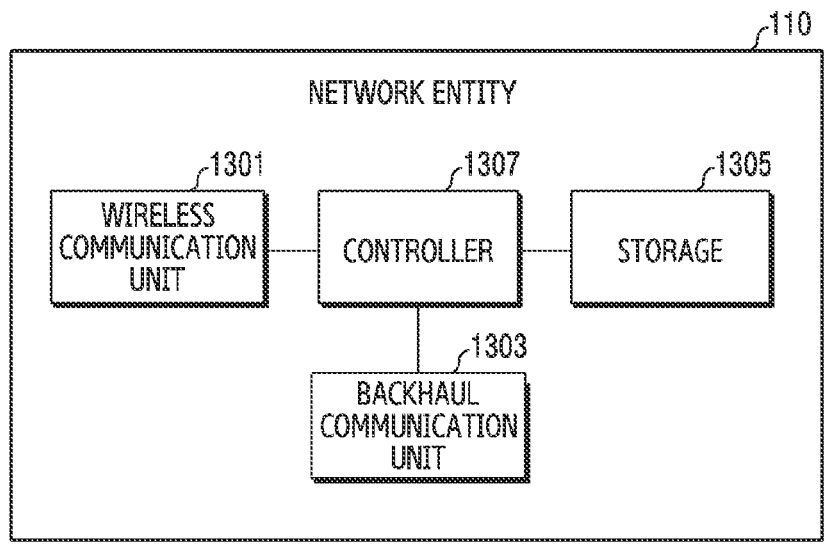
FIG. 13 is a block diagram illustrating an example configuration of a base station in a wireless communication system according to various embodiments.

FIG. 13 is a block diagram illustrating an example configuration of a base station in a wireless communication system according to various embodiments. The term "unit" or terms ending with suffixes "-er," and "-or", used in the following description, refer to a unit processing at least one function or operation, and may be implemented by hardware, software, or a combination of hardware and software.

Referring to FIG. 13, the base station may include a wireless communication unit (e.g., including communication circuitry) 1301, a backhaul communication unit (e.g., including various processing circuitry and/or executable program instructions) 1303, a storage 1305, and a controller (e.g., including control/processing circuitry) 1307.

The wireless communication unit 1301 may include various communication circuitry and performs functions for transmitting and receiving signals via a wireless channel. For example, the wireless communication unit 1301 may perform a function of converting between a baseband signal and a bit stream according to a physical layer standard of a system. For example, when transmitting data, the wireless communication unit 1301 may generate complex symbols by encoding and modulating a transmission bit stream. In addition, when receiving data, the wireless communication unit 1301 may restore a reception bit stream by demodulating and decoding a baseband signal. In addition, the wireless communication unit 1301 may up-convert a baseband signal into a radio frequency (RF) band signal, and then may transmit the signal via an antenna, and may down-convert an RF band signal received via an antenna into a baseband signal.

To achieve this, the wireless communication unit 1301 may include a transmission filter, a reception filter, an amplifier, a mixer, an oscillator, a digital to analog converter (DAC), an analog to digital converter (ADC), or the like. In addition, the wireless communication unit 1301 may include a plurality of transmission and reception paths. Furthermore, the wireless communication unit 1301 may include at least one antenna array including a plurality of antenna elements. In the hardware aspect, the wireless communication unit 1301 may be configured by a digital unit and an analog unit, and the analog unit may be configured by a plurality of sub-units according to operating power, an operating frequency, or the like. According to an embodiment, the wireless communication unit 1301 may include a unit for forming a beam, that is, a beamforming unit. For example, the wireless communication unit 1301 may include a massive MIMO unit (MMU) for beamforming.

The wireless communication unit 1301 may transmit and receive signals. To achieve this, the wireless communication unit 1301 may include at least one transceiver. For example, the wireless communication unit 1301 may transmit a synchronization signal, a reference signal, system information, a message, control information, or data, etc. In addition, the wireless communication unit 1301 may perform beamforming. The wireless communication unit 1301 may apply a beamforming weight to a signal in order to give directionality according to configuration of the controller 1307 to a signal to transmit or receive. According to an embodiment, the wireless communication unit 1301 may generate a baseband signal according to a result of scheduling and a result of calculating transmission power. In addition, an RF unit in the wireless communication unit 1301 may transmit a generated signal through an antenna.

The wireless communication unit 1301 may transmit and receive signals as described above. Accordingly, an entirety or a part of the wireless communication unit 1301 may be referred to as "transmitter," "receiver," or "transceiver." In addition, in the following description, transmitting and receiving via a wireless channel may be used as a meaning including processing by the wireless communication unit 1301 as described above.

The backhaul communication unit 1303 may include various processing circuitry and/or executable program instructions and provides an interface for communicating with the other nodes in a network. That is, the backhaul communication unit 1303 may convert a bit stream to be transmitted from the base station to another node, for example, another access node, another base station, a higher node, a core network, or the like, into a physical signal, and may convert a physical signal transmitted from another node into a bit stream.

The storage 1305 may store data such as a basic program for operations of the base station, an application program, configuration information, or the like. The storage 1305 may include a memory. The storage 1305 may be configured by a volatile memory, a nonvolatile memory, or a combination of a volatile memory and a nonvolatile memory. In addition, the storage 1305 provides stored data according to a request of the controller 1307. According to an embodiment, the storage 1305 may store mapping information defining a relationship of a HARQ process ID and an RLC PDU/MAC SDU or an MAC PDU/TB. In addition, according to an embodiment, the mapping information may include real data in addition to an ID of data. The real data may be stored in a buffer of the storage 1305. In addition, according to an embodiment, the mapping information may include time information related to a time of mapping or a time of inserting a new TB into a HARQ process.

The controller 1307 may include various processing/control circuitry and controls overall operations of the base station. For example, the controller 1307 may transmit and receive signals via the wireless communication unit 1301 or the backhaul communication unit 1303. In addition, the controller 1307 may write and read out data on and from the storage 1305. In addition, the controller 1307 may perform functions of a protocol stack required by communication standards. To achieve this, the controller 1307 may include at least one processor. According to various embodiments, the controller 1307 may control the base station to perform operations according to various embodiments described above. According to various embodiments, the base station may transmit data for a new TB based on an HARQ process before receiving feedback information on the HARQ process. That is, the base station may insert a new TB into the HARQ process independently from feedback information on the HARQ process. In addition, according to an embodiment, the base station may utilize pre-transmitted data based on mapping information of the storage 1305. That is, the base station may configure data corresponding a TB in which NACK information is received even if the HARQ process is different. From the viewpoint of a terminal, the data may be indicated as new data (for example, an NDI is toggled, an RV is initialized), but the base station may perform retransmission.

The configuration of the base station 110 shown in FIG. 13 is merely an example of the base station, and the example of the base station performing various embodiments of the disclosure is not limited by the configuration shown in FIG. 13. For example, according to various embodiments, some configurations may be added, deleted, changed, etc.

In FIG. 13, the base station is illustrated as one entity, but the disclosure is not limited thereto. The base station according to various embodiments of the disclosure may be implemented to form an access network having not only an integral deployment but also a distributed deployment. According to an embodiment, the base station may be classified into a central unit (CU) and a digital unit (DU), and the CU may be implemented perform upper layer functions (for example, packet data convergence protocol (PDCP) RRC), and the DU may be implemented to perform lower layer functions (for example, medium access control (MAC), physical (PHY)).

Figure 14:
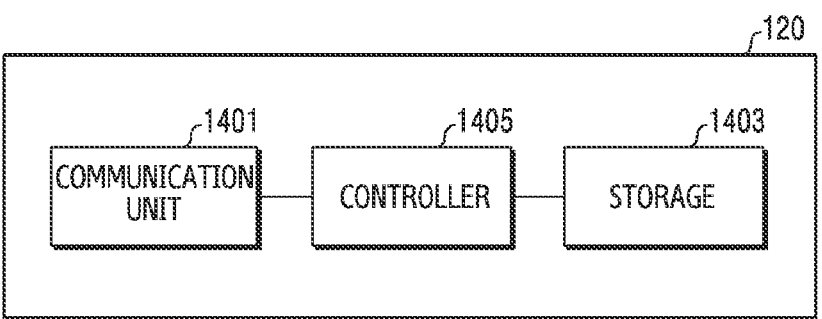
FIG. 14 is a block diagram illustrating an example configuration of a terminal in a wireless communication system according to various embodiments.

FIG. 14 is a block diagram illustrating an example configuration of a terminal in a wireless communication system according to various embodiments. The term "unit" or terms ending with suffixes "-er," and "-or" used in the following description refer to a unit processing at least one function or operation, and may be implemented by hardware, software, or a combination of hardware and software.

Referring to FIG. 14, the terminal may include a communication unit (e.g., including communication circuitry 1401, a storage 1403, and a controller (e.g., including control/processing circuitry) 1405.

The communication unit 1401 may include various communication circuitry and performs functions for transmitting and receiving signals via a wireless channel. For example, the communication unit 1401 may perform a function of converting between a baseband signal and a bit stream according to a physical layer standard of a system. For example, when transmitting data, the communication unit 1401 may generate complex symbols by encoding and modulating a transmission bit stream. In addition, when receiving data, the communication unit 1401 may restore a reception bit stream by demodulating and decoding a baseband signal. In addition, the communication unit 1401 may up-convert a baseband signal into an RF band signal, and then may transmit the signal via an antenna, and may down-convert an RF band signal received via an antenna into a baseband signal. For example, the communication unit 1401 may include a transmission filter, a reception filter, an amplifier, a mixer, an oscillator, a DAC, an ADC, or the like.

In addition, the communication unit 1401 may include a plurality of transmission and reception paths. Furthermore, the communication unit 1401 may include an antenna unit. The communication unit 1401 may include at least one antenna array including a plurality of antenna elements. In the hardware aspect, the communication unit 1401 may be configured by a digital circuit and an analog circuit (for example, a radio frequency integrated circuit (RFIC)). Herein, the digital circuit and the analogue circuit may be implemented as a single package. In addition, the communication unit 1401 may include a plurality of RF chains. The communication unit 1401 may perform beamforming. The communication unit 1401 may apply a beamforming weight to a signal in order to give directionality according to configuration of the controller 1405 to a signal to transmit or receive.

In addition, the communication unit 1401 may transmit and receive signals. To achieve this, the communication unit 1401 may include at least one transceiver. The communication unit 1401 may receive a downlink signal. The downlink signal may include a synchronization signal (SS), a reference signal (RS) (for example, cell-specific reference signal (CRS), demodulation (DM)-RS), system information (for example, MIB, SIB, remaining system information (RMSI), other system information (OSI)), a configuration message, control information or downlink data. In addition, the communication unit 1401 may transmit an uplink signal. The uplink signal may include a random access-related signal (for example, a random access preamble (RAP) (or a message 1 (Msg 1), message 3 (Msg 3)), a reference signal (for example, a sounding reference signal (SRS), a DM-RS), or a buffer status report (BSR), etc.

For example, the communication unit 1401 may include an RF processing unit and a baseband processing unit. The RF processing unit may perform a function for transmitting and receiving signals via a wireless channel, such as signal band conversion, amplification, etc. For example, the RF processing unit may up-convert a baseband signal provided from the baseband processing unit into an RF band signal, and then may transmit the signal via an antenna, and may down-convert an RF band signal received via the antenna into a baseband signal. For example, the RF processing unit may include a transmission filter, a reception filter, an amplifier, a mixer, an oscillator, a digital to analogue converter (DAC), an analog to digital converter (ADC), or the like. In FIG. 2H, only one antenna is illustrated, but the terminal may include a plurality of antennas. In addition, the RF processing unit may include a plurality of RF chains. Furthermore, the RF processing unit may perform beamforming. For the beamforming, the RF processing unit may adjust a phase and a size of each of the signals transmitted and received through the plurality of antennas or antenna elements.

The baseband processing unit may perform a function of converting between a baseband signal and a bit stream according to a physical layer standard of a system. For example, when transmitting data, the baseband processing unit may generate complex symbols by encoding and modulating a transmission bit stream. In addition, when receiving data, the baseband processing unit may restore a reception bit stream by demodulating and decoding a baseband signal provided from the RF processing unit. For example, when transmitting data according to an orthogonal frequency division multiplexing (OFDM) method, the baseband processing unit may generate complex symbols by encoding and modulating a transmission bit stream, may map the complex symbols onto subcarriers, and then, may configure OFDM symbols through inverse fast Fourier transform (IFFT) operation and cyclic prefix (CP) insertion. In addition, when receiving data, the baseband processing unit may divide a baseband signal provided from the RF processing unit in the unit of an OFDM symbol, may restore signals mapped onto subcarriers through fast Fourier transform (FFT) operation, and then, may restore a reception bit stream by demodulating and decoding.

The communication unit 1401 may transmit and receive signals as described above. Accordingly, an entirety or part of the communication unit 1401 may be referred to as "transmitter," "receiver," or "transceiver." Furthermore, the communication unit 1401 may include a plurality of communication modules to support a plurality of different radio access techniques. In addition, the communication unit 1401 may include different communication modules to process signals of different frequency bands. For example, the different radio access techniques may include a wireless local area network (LAN) (for example, IEEE 802.1x), a cellular network (for example, long term evolution (LTE), new radio (NR)), etc. In addition, the different frequency bands may include a super high frequency (SHF) (for example, 2.5 GHz, 5 GHz) band, a millimeter wave (for example, 60 GHz) band. In addition, the communication unit 1401 may use the same radio access technique on the different frequency bands (for example, an unlicensed band for licensed assisted access (LAA), citizens broadband radio service (CBRS) (for example, 3.5 GHz)).

The storage 1403 may store data such as a basic program for operations of the terminal, an application program, configuration information, or the like. The storage 1403 may be configured by a volatile memory, a nonvolatile memory, or a combination of a volatile memory and a nonvolatile memory. In addition, the storage 1403 may store data such as a basic program for operations of the terminal, an application program, configuration information, or the like.

The controller 1405 may include various control/processing circuitry and controls overall operations of the terminal. For example, the controller 1405 may transmit and receive signals via the communication unit 1401. In addition, the controller 1405 may write and read out data on and from the storage 1403. In addition, the controller 1405 may perform functions of a protocol stack required by communication standards. To achieve this, the controller 1405 may include at least one processor. The controller 1405 may include at least one process or a micro processor, or may be a part of a processor. In addition, a part of the communication unit 1401 and the controller 1405 may be referred to as a communication processor (CP). The controller 1405 may include various modules to perform communication. According to various embodiments, the controller 1405 may control the terminal to perform operations according to various embodiments, which will be described below.

The controller 1405 controls overall operations of the terminal. For example, the controller 1405 may transmit and receive signals via the communication unit 1401. In addition, the controller 1405 may write and read out data on and from the storage 1403. To achieve this, the controller 1405 may include at least one processor. For example, the controller 1405 may include a communication processor (CP) to perform control for communication, and an application processor (AP) to control a higher layer such as an application program. According to an embodiment of the disclosure, the controller 1405 may include a multi-connection processing unit to perform processing for operating in a multi-connection mode. For example, the controller 1405 may control the terminal to perform the operations according to various embodiments described above. According to various embodiments, the controller 1405 may individually perform an HARQ process procedure based on the number of O-HARQ feedbacks. The controller 1405 may identify an HARQ process number, an NDI, an RV, a TBS included in HARQ information. The controller 1405 may decode data (PDSCH), and may feed a result therefrom back to the terminal.

According to various embodiments of the disclosure, the HARQ method which is utilized as a retransmission procedure in a wireless communication system may be adaptively operated to obtain a bit combination according to the HARQ method or to follow a separate retransmission procedure by abandoning a corresponding gain, according to a given situation. In particular, additional processing (for example, a low data rate, a low MCS level, etc., segmentation) may be performed to more stably transmit during retransmission. In addition, an O-HARQ process may be adaptively selected from all of the HARQ processes, and may be operated, so that a problem arising when an exiting HARQ procedure is not followed may be reduced preemptively.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described example embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating a base station in a wireless communication system, the method comprising:
transmitting first data based on a first hybrid automatic request (HARQ) process at a transmission time of the first HARQ process;
generating, by a MAC layer entity, mapping information regarding a relationship between the first HARQ process and the first data;
before receiving a result of reception of the first data, transmitting second data based on the first HARQ process with a new data indicator (NDI) indicating that the second data is a new data and is not retransmission of the first data, at a next transmission time of the first HARQ process;
receiving the result of reception of the first data indicating negative-acknowledgement (NACK);
identifying the first data based on the mapping information and the NACK;
generating third data for retransmitting the first data; and
transmitting the third data based on a second HARQ process which is different from the first HARQ process,
wherein the mapping information comprises an identifier (ID) of the first HARQ process, an identifier (ID) on the first data, a packet of the first data, and timing information regarding a time when a Protocol Data Unit (PDU) or Service Data Unit (SDU) is delivered through the first HARQ process ID.

2. The method of claim 1, wherein the packet comprises a radio link control (RLC) PDU, and
wherein the identifier on the first data includes a sequence number (SN).

3. The method of claim 1, wherein the packet comprises a radio link control (RLC) SDU, and
wherein the identifier on the first data comprises an identifier (ID) for indicating the RLC SDU.

4. The method of claim 1, wherein the third data is transmitted with a transport block size (TBS) smaller than the first data or a lower modulation and coding scheme (MCS) level.

5. The method of claim 1, wherein transmitting the second data comprises:

determining whether a HARQ process exists in which a transmission procedure accompanied by a HARQ process operation is not in progress among all HARQ processes;
based on the HARQ process in which the transmission procedure accompanied by the HARQ process operation not being in progress among all the HARQ processes, identifying the first HARQ process; and
transmitting the second data based on the identified first HARQ process.

6. A base station in a wireless communication system, the base station comprising:
at least one transceiver; and
at least one processor, comprising processing circuitry, coupled with the at least one transceiver,
wherein the at least one processor is configured to:
transmit first data based on a first hybrid automatic request (HARQ) process at a transmission time of the first HARQ process;
generate, by a MAC layer entity, mapping information regarding a relationship between the first HARQ process and the first data;
before receiving a result of reception of the first data, transmit second data based on the first HARQ process with a new data indicator (NDI) indicating that the second data is a new data and is not retransmission of the first data, at a next transmission time of the first HARQ process;
receive the result of reception of the first data indicating negative-acknowledgement (NACK);
identify the first data based on the mapping information and the NACK;
generate third data for retransmitting the first data; and
transmit the third data based on a second HARQ process which is different from the first HARQ process,
wherein the mapping information comprises an identifier (ID) of the first HARQ process, an identifier (ID) on the first data, a packet of the first data, and timing information regarding a time when a Protocol Data Unit (PDU) or Service Data Unit (SDU) is delivered through the first HARQ process ID.

7. The base station of claim 6, wherein the packet comprises a radio link control (RLC) PDU, and
wherein the identifier on the first data includes a sequence number (SN).

8. The base station of claim 6, wherein the packet comprises a radio link control (RLC) SDU, and
wherein the identifier on the first data comprises an identifier (ID) for indicating the RLC SDU.

9. The base station of claim 6, wherein the third data is transmitted with a transport block size (TBS) smaller than the first data or a lower modulation and coding scheme (MCS) level.

10. The base station of claim 6, wherein, to transmit the second data, the at least one processor is configured to:
determine whether a HARQ process exists in which a transmission procedure accompanied by a HARQ process operation is not in progress among all HARQ processes;
based on the HARQ process in which the transmission procedure accompanied by the HARQ process operation not being in progress among all the HARQ processes, identify the first HARQ process; and
control the at least one transceiver to transmit the second data based on the identified first HARQ process.

11. The base station of claim 6, wherein, to transmit the second data, the at least one processor is configured to, based on the result of receiving of the first data not being acquired, control the at least one transceiver to transmit the second data.

12. A non-transitory computer-readable storage medium comprising instructions which, when executed by a base station of a wireless communication system including at least one processor, cause the base station to:

transmit first data based on a first hybrid automatic request (HARQ) process at a transmission time of the first HARQ process;

generate, by a MAC layer entity, mapping information regarding a relationship between the first HARQ process and the first data;

before receiving a result of reception of the first data, transmit second data based on the first HARQ process with a new data indicator (NDI) indicating that the second data is a new data and is not retransmission of the first data, at a next transmission time of the first HARQ process;

receive the result of reception of the first data indicating negative-acknowledgement (NACK);

identify the first data based on the mapping information and the NACK;

generate third data for retransmitting the first data; and transmit the third data based on a second HARQ process which is different from the first HARQ process, wherein the mapping information comprises an identifier (ID) of the first HARQ process, an identifier (ID) on the first data, a packet of the first data, and timing information regarding a time when a Protocol Data Unit (PDU) or Service Data Unit (SDU) is delivered through the first HARQ process ID.

* * * * *